Dec. 13, 1966 R. L. LILLESTRAND ETAL 3,290,933
NAVIGATION SYSTEMS

Filed Oct. 18, 1965 10 Sheets-Sheet 1

INVENTORS
ROBERT L. LILLESTRAND
JOSEPH E. CARROLL
CHARLES J. PURCELL
BY Alexander & Dowell
ATTORNEYS

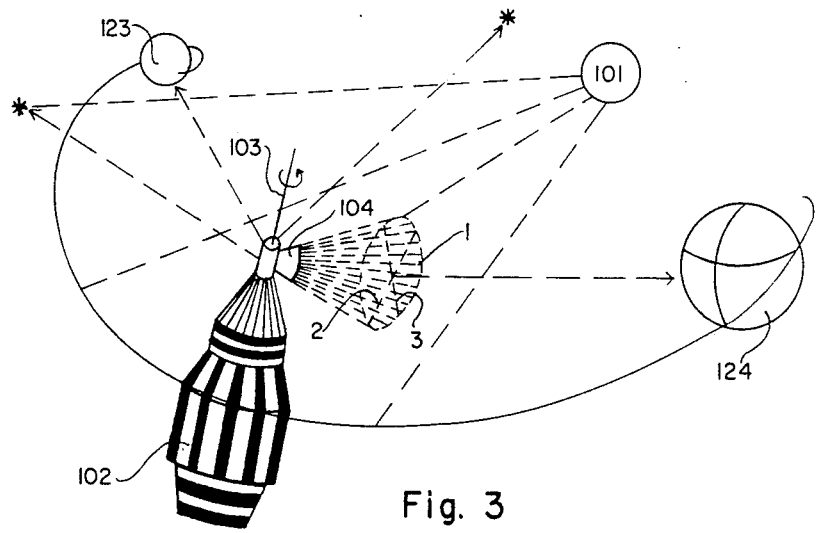
Fig. 3
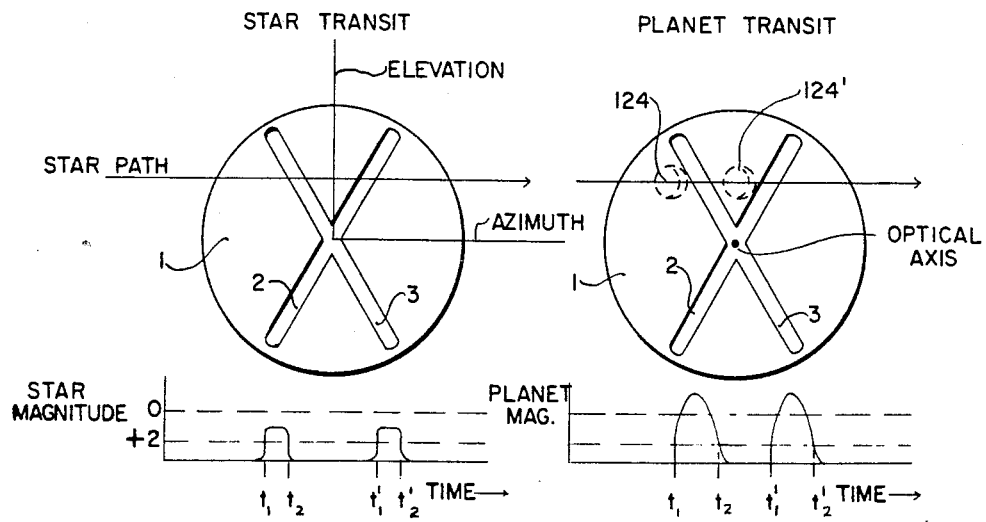
Fig. 4
Fig. 4a

Dec. 13, 1966     R. L. LILLESTRAND ETAL     3,290,933
NAVIGATION SYSTEMS
Filed Oct. 18, 1965                                            10 Sheets-Sheet 3

INVENTORS
ROBERT L. LILLESTRAND
JOSEPH E. CARROLL
CHARLES J. PURCELL
BY
*Alexander & Dowell*
ATTORNEYS Dec. 13, 1966  R. L. LILLESTRAND ETAL  3,290,933
NAVIGATION SYSTEMS
Filed Oct. 18, 1965  10 Sheets-Sheet 4

INVENTORS
ROBERT L. LILLESTRAND
JOSEPH E. CARROLL
CHARLES J. PURCELL
BY *Alexander & Dowell*
ATTORNEYS Dec. 13, 1966 R. L. LILLESTRAND ETAL 3,290,933
NAVIGATION SYSTEMS
Filed Oct. 18, 1965 10 Sheets-Sheet 7

INVENTORS
ROBERT L. LILLESTRAND
JOSEPH E. CARROLL
CHARLES J. PURCELL
BY Alexander & Dowell
ATTORNEYS Dec. 13, 1966    R. L. LILLESTRAND ET AL    3,290,933
NAVIGATION SYSTEMS Filed Oct. 18, 1965    10 Sheets-Sheet 10

INVENTORS
ROBERT L. LILLESTRAND
JOSEPH E. CARROLL
CHARLES J. PURCELL

BY *Alexander & Dowell*
ATTORNEYS

United States Patent Office 3,290,933
Patented Dec. 13, 1966

3,290,933
NAVIGATION SYSTEMS
Robert L. Lillestrand, Minneapolis, Minn. (7104 Down Road, Edina, Minn.); Joseph E. Carroll, 4261 Queens Way, Minnetonka, Minn.; and Charles J. Purcell, 1216 W. Shryer Ave., St. Paul, Minn.
Filed Oct. 18, 1965, Ser. No. 497,435
15 Claims. (Cl. 73—178)

This invention relates to methods and means for measuring the relative angles between celestial bodies including the planets and satellites in and near the ecliptic plane of our solar system and including the stars located in space beyond the solar system, and more particularly relates to methods and means for determining the locations and attitudes of space vehicles when traveling between said planets and/or their moons as well as the location of the vehicle itself when on or near the surface of one such celestial body.

This is a continuation-in-part of abandoned co-pending application Serial No. 150,444, filed November 6, 1961, and relating to "Navigation Systems."

In the past, methods and apparatus have been proposed for determining locations and attitudes by measuring the apparent positions of, and the angles between, celestial bodies generally using theodolites functioning to directly measure the absolute angular separations between such celestial bodies, or by making measurements with reference to some stabilized plane of reference, or by using similar instruments to measure angular relationships between a planet and a relatively small field of stars therebeyond. These prior-art proposals have suffered from a plurality of practical and economic disadvantages which the present invention seeks to obviate.

It is a principal object of this invention to provide novel methods and systems for measuring the angular relationships between celestial bodies and for using these measurements to quickly and accurately orient a vehicle in space, to determine mid-course vehicle locations, to determine positions near the terminal course even within a few diameters of a planet or moon, and even to determine the surface position of a vehicle after a landing has been effected.

The term "vehicle" is to be broadly interpreted as referring to any structure which either packages or supports the instrumentation comprising the present system. A "vehicle" according to the present disclosure may be anything from an instrument chassis to a manned station. The present disclosure defines locations and attitudes variously in terms of instrument optical system coordinates, vehicle coordinates, and/or celestial coordinates, and sets forth hereinafter the mathematical relationships therebetween for various cases of general interest.

Of particular importance is the versatility of the invention compared with the prior art. Its special wide angle camera has inherent ability to provide data over extended regions of the sky and to provide data relating to planetary positions when viewed from great distances or from very short distances. Thus, with a single detection instrument and a variety of calculational techniques, navigational problems can be solved which include the determination of the position of a vehicle on the surface of a distant planet, problems of planetary satellite navigation, and problems of interplanetary navigation. Moreover, since the functioning of the present system does not require the presence of a human operator, it is usable in both manned and unmanned vehicles.

The system is capable of continuously monitoring the positions of a multiplicity of targets because of the inherent track-while-scan functioning, as distinguished from prior-art tracking telescopes which point at only a single target.

It is another important object of this invention to provide a method and system which can be operated intermittently to determine vehicle position in space without requiring the continuous operation of the apparatus or the memory-storing of acquired knowledge of the approach to the present position, velocity, or vehicle orientation. Stated otherwise, this system is capable of determining the position in space at any time, starting with no previously acquired information, and therefore differs drastically from a system which would be based on dead-reckoning type navigation.

It is another principal object of the invention to provide a system employing a novel optical scanner which operates with great accuracy to determine orientation and location with reference to three coordinate axes when the instrument scanner is stabilized about only a single axis of spin, instead of requiring two or three stabilized axes as is the case with most prior-art scanners, such as theodolites and other telescope sensors. The degree of accuracy achieved is of the order of five seconds of arc for the determination of the edges of planets, so that in cislunar space a positional accuracy of about 10 kilometers can be achieved.

Still a further primary object of the invention is to provide an improved relative-angle sensing system in a preferred embodiment of which angular determinations are made by a rotating scanner revolving at a uniform rate about its axis of spin. This scanner measures the relative angular separations between celestial bodies in its field of scan as a function of the time intervals between detection of their radiations, as distinguished from measuring the absolute angles in degrees relative to a common stabilized reference plane, time intervals being determinable with greater accuracy than angular separations in degrees, especially under space-travel conditions.

Another object of major importance is to provide a method and system, including a uniformly rotating scanner, which is capable of determining the attitude of the vehicle by scanning a continuous narrow sector of space and making an attitude determination based upon the positions of several of the brightest celestial bodies which happen to lie in the particular sector scanned, this system being distinguished from prior-art systems of the type which operate by selecting particular targets and then using an instrument having a narrow field of view and fixing thereon to determine the positions thereof relative to the coordinate frame of the space vehicle, this type of prior-art system requiring not only auxiliary instruments for target acquisition but also requiring either one or two additional degrees of freedom of the instrument itself in order that it can be stabilized upon the target whose angle is to be determined. Such prior art equipment, aside from the above difficulties, also requires the use of a complex angle encoder.

Still another type of prior art system which measures the position of a planetary target relative to an adjacent field of stars beyond it also involves the problem of providing a stabilized platform and corrections for the deviation of the center of radiant intensity from the center of mass due to the variable solar aspect angle. In this case, the position of the planet relative to the stars lying within a radius of a few degrees thereof is determined. This latter system has an advantage in that orientation of the platform supporting the camera need not be known or even held constant, so long as the instrument can be held fixed on the planet which is being used for angular determination. However, in this system it is necessary to either employ two cameras, simultaneously tracking two bodies within the solar system, or else it is necessary to point the camera back and forth from one target to the other. Thus, this technique also requires auxiliary target acquisition equipment. In addition, this approach has the disadvantage of requiring the use of relatively faint stars, perhaps as faint as the eighth or tenth magnitude, because of the fact that these may be the only stars available behind the specific planets which must be used in order to obtain accurate positional information, remembering that not all planets in the solar system at any particular instant provide the same degree of accuracy of angular information. Thus, this system introduces a serious problem of star identification, and in vew of the very great number of stars which from time to time appear behind various planets, the amount of data to be stored in the memory of the associated position computer becomes excessive. Also, it is impractical to attempt to avoid this problem by enlarging the field of view of the camera to find brighter stars, because loss of accuracy due to limited resolution of the detection instrument results from such enlargement.

It is a very great advantage of the present inventive system that it is not necessary for the scanning means to pause or fix on any particular planet, but that the scanning system can be rotated at a uniform rate to scan a sector of space surrounding the space vehicle, and to make a full determination of the attitude of the vehicle from the information gained thereby, the field of view of the scanner having been made wide enough to provide satisfactory information regardless of what particular sector is scanned. Since the invention does not require that the detector be continuously pointed at specific targets, a closed loop control system is not required, thus effecting a simplification in the associated electronics and an increase in reliability.

Still another very important object of the invention is to provide an instrument which can determine the position of the space vehicle relative to the planets in the ecliptic by measuring the positions of short sections of the planetary limbs, thereby avoiding spurious effects attributable to planetary albedo, shape, or solar aspect angle, while also avoiding the necessity of determining the geometric center of a planet.

A further object of the invention is to provide a system in which bias thresholds are used in association with photosensitive detector means in the optical scanner for limiting according to brightness the range of solar bodies to which the instrument is responsive by eliminating all bodies having an intensity smaller than approximately the second magnitude so that the number of angular relationships between stars to which the system is responsive can be greatly reduced, thereby simplifying the encoding of this information into the computer. Moreover, it is an object of the invention to provide means for limiting the maximum brightness to which the system is responsive when scanning only the stars during attitude determination so as to eliminate spurious signals caused by the scanning of planets when the instrument is performing attitude determining functions which are based entirely on the scanning of stars.

Another important object of the invention is to provide an instrument which measures the angular displacement between at least three celestial bodies, the information measured as between two such bodies being employed to determine position, or attitude, and the data of the third body being used as a check on the the first determination to insure that a false determination has not been made based on similarity of the angles between several different pairs of stars, or based upon a false signal spuriously entering the scanner.

It is another object of this invention to provide means for automatically protecting the photomultipliers in the optical scanner from exposure to direct sunlight by providing an automatic shutter which covers the photomultipliers when the scanner traverses the sun, and which system also includes the additional advantage of providing means for locating the position of the sun at the precise moment when the instrument is axially aligned therewith.

Yet another object of the invention is to provide a motor-driven system for use in rotating the sensor employing a flywheel having the same mass as the scanner which is turned in an opposite direction therefrom by the motor so that the turning torque is applied to the flywheel rather than to the space vehicle whereby substantially no rotating torque is applied to the latter.

Considering now the general features of the present novel method and system designed to accomplish the above objects, the system is a self-contained optical scanner and computer which is located in a space vehicle, which is presumed to have other equipment by which the attitude of the vehicle in space can be corrected and maintained after the present system has determined what the attitude is.

For purposes of present illustration it is assumed that the space vehicle will be traveling substantially in the ecliptic plane inasmuch as the earth is in the ecliptic plane and inasmuch as other planets which may comprise the destination of the space vehicle are also located substantially in the ecliptic plane. At times, the travel of the space vehicle may not be parallel with the ecliptic plane, for instance as when the vehicle is traveling between a planet and one of its moons, and perhaps in a direction which has a component normal to the ecliptic plane. However, for present purposes it is assumed that all of the planets and their moons are so close to the ecliptic plane that they can be considered as lying therein, at least when sighted at a very great distance. As stated above, it is necessary that the scanning means of the present instrument be rotated about an axis at a substantially constant rate, and it is convenient to have this axis of rotation correspond with an axis of the space vehicle on which it is supported. Considering several practical examples, it is convenient to have the optical scanner either fixed to the space vehicle and then rotate both the space vehicle and the scanner about the axis of rotation of the scanner, or alternatively it is convenient to have the scanner motor-driven about its own axis relative to the space vehicle so that only the scanner need be rotated and the rotation rate of the vehicle, if any, can be separately determined. In a manned space vehicle it is better that the instrument be rotatable separately from the body of the vehicle. At any rate, it is assumed that the space vehicle can be reasonably well stabilized so as to permit at most a slow rate of tumble. Measurements from a more rapidly tumbling vehicle employing the present system are possible, but they greatly complicate the computations which are necessary to resolve the visual information obtained.

The present system includes an optical scanner having a field of view of approximately 30 degrees disposed to be rotated about an axis of spin with the direction of view extending radially therefrom. The present method and apparatus are based upon the fact that the angular separations between a number of stars of relatively great brightness are known and tabulated and are essentially constant as measured from any point in our solar system. There are about 100 stars having brightnesses equal to or greater than 2.6 magnitude, and it is believed that the use of about 70 of the brightest of these stars provides a complete enough distribution of stars that accurate determination of attitude can be made by scanning a relatively narrow sector of space, an angular coverage of about 26 degrees being sufficient to always pick up at least three of these stars. These angular separations are well known in astronomy and have been thoroughly catalogued, and it is only necessary that these separations be programmed into a digital computer so that angular separations measured by the present optical scanner can be compared therewith in order to establish the attitude of the space vehicle. Only the stars are used to determine attitude in view of the fact that the relative planetary positions are variable with time, whereas the star positions remain substantially fixed as viewed from our solar system. Moreover, the planets cannot be depended upon to determine the attitude of the vehicle in space in view of the fact that the planets all lie substantially in the ecliptic plane, and the random scanning of the optical head will probably not be in that plane except in a rare case in which the initial spin axis happens to be oriented normal thereto. Since in all probability, the spin axis of the instrument will not be initially oriented normal to the ecliptic plane, its initial attitude must be determined and it is because of the undependability of the planets for purposes of determining attitude that an upper bias threshold is placed upon the brightness of celestial bodies used for attitude determination, thereby eliminating most of the planets as sources of spurious interference with the arrangement of stars used for attitude determination.

Beginning with the attitude of the spin axis of the instrument completely unknown, the instrument is rotated at a constant rate, and as it rotates it picks up various stars located in a sector being scanned and lying in a viewing direction substantially normal to the axis of scan. Since the instrument is being rotated at a constant rate, some star is selected and used as a starting point to determine what the period of rotation actually is, so that the relative angles between detected bodies can be determined in terms of the rotational period. This information is fed to the local computer which then sets up a relationship between the various angles in 360 degrees of rotation and the various time intervals between the viewing of at least three stars having magnitudes lying within upper and lower threshold limits.

The present instrument measures, by means of two mutually inclined slots, the amplitude of the pulses delivered by the optical system and corresponding with the stars intercepted at these slots. The two pulses representing any given star can be paired. The difference in arrival time of such paired pulses indicates the displacement of the star from the central plane of the space sector being scanned, and there are various convenient ways of determining the direction of such displacements as will be described hereinafter, for instance by crossing the two slots and then either optically or electrically identifying which slot first viewed the star in question. The azimuth position of the star along the scanned sector can be determined by averaging the times of arrival of its image in the two slots. From this data the actual angular separations between the various stars based on the measured transit times can be computed so that the stars themselves can be identified by comparison with an ephemeris. When the stars have been thus identified, the attitude of the vehicle in space is known and corrective measures can be taken by the vehicle's navigation equipment in order to change the orientation of the vehicle to place the axis of spin of the scanner in a position which is more nearly perpendicular to the ecliptic plane.

The vehicle has now been oriented and the instrument then makes all further determinations on the basis of the positions of the planets as well as a few bright stars in or near the ecliptic plane by a series of triangulations. The triangulation is accomplished substantially in the same way as when locating and identifying the stars, except that instead of comparing the known and fixed angular separations between the stars with a matrix in the computer, the data obtained by scanning substantially in the ecliptic plane and determining the positions of the planets therein must be compared with other stored data comprising an ephemeris, or almanac, of positions of the planets versus time.

There are several ways in which the angular separations between the planets can be used to determine the position of the space vehicle in the ecliptic plane. Firstly by simple triangulations using two planets, plus a third planet serving as a consistency check. This could even be done manually. Alternatively, there is a much more sophisticated, but at the same time more accurate system, known as polyangulation in which a plurality of matrix type equations are set up based on the least square polyangulation theory, these equations being relatively easily solved by a digital computer, but being far too complicated for manual solution. Both systems will be discussed hereinafter.

As is evident, the principal result of the measurements made by the present instrument is the determination of the angular separations of various celestial bodies one from another. To accomplish this while providing the instrument with a simple scan motion, the present optical scanner must be provided with a mask arrangement having apertures, the mask lying in the focal plane of the optical system. Several different configurations of slit type apertures will be considered in the present specification, but for purposes of describing a preferred embodiment, a pair of slits will be considered, each of the slits being about 30 degrees in length and approximately one or two minutes of arc wide. This pair will cross each other at the point of intersection of the optical axis and the focal plane. When using the crossed slits with photomultiplier means located behind the slits and having uniform sensitivity over the whole slit area, a target passing the slits at their point of intersection provides only a single impulse in the photomultiplier means, whereas targets passing above or below the center of the scan plane (the plane defined by the motion of the optical axis as the instrument rotates in space) provide two electrical pulses at the output of the photomultiplier means. The time intervals between two pulses made by a target become greater the further the target is located outside the scan plane. This configuration makes it possible to determine the elevation of a target by subtracting the times of arrival of the target at each of the two slits to provide a difference proportional to the elevation of the target out of the scan plane. The question of whether the target is above or below the scan plane, such information being desired to enhance the probability of correct identification, can be determined as set forth above by identifying which of the crossed slits first views the target image. Separate photomultipliers for the two slits are helpful for this purpose. Where a common photomultiplier is used for both slits, the slit widths can be made different so that the resulting pulses have different widths, thereby identifying the sequence in which the image crossed the two slits. Moreover, it is possible to add together the two times of arrival and thereby average them so as to obtain a single signal which is representative of the azimuth position of the target along the scan plane.

It is therefore a very important object of this invention to provide an improved optical scanner by which both the azimuth angle in the scan plane and also the elevation thereabove of each of the targets scanned can be easily and quickly determined to a great degree of accuracy. Knowledge of this information for two targets permits quick computation of their mutual angular separation.

It is not necessary that the two slits be oriented normal to each other, and for certain purposes it is advantageous to change the angles between the crossed slits as will be discussed hereinafter. In addition, by providing a third slit which bisects the angle between the other two, it is possible to add an additional feature to the scanner whereby the angle subtended by the diameter of a nearby planet can also be determined. This feature is particularly useful in the final stages of a space flight when approaching a planet so as to provide a determination of the distance from the surface of the planet, i.e., when the vehicle is closer than approximately ten diameters of the planet away from the surface thereof.

Recapitulating, major features of the method and system of the present invention are that the instrumentation requires almost no moving parts, aside from those required to produce spin about an axis and a moving shutter to block out the direct light of the sun from the photomultiplier means; that it requires the scanning of only a relatively few targets whose brightness is approximately equal to or greater than the second magnitude; that scanning times between targets can be used to determine angles, rather than measuring angles in degrees which requires much more complicated equipment from a mechanical viewpoint and greater stabilization of the planes of reference; that the problem of finding the center of a planet is avoided by measuring the position of the illuminated planetary limb; and that the scanner of the present system is advantageously combined with local digital computer means which not only make the system more practical and provide quick results which are necessary to correct the attitude of the vehicle in space before it has a chance to drift materially from its present attitude, but which computer means in combination with the optical scanning means permits a statistical determination of position employing polyangulation techniques based on the bearings of a plurality of planets, which techniques virtually eliminate the possibility of gross errors which may occur under certain conditions when triangulating using only two planets. In addition, the best possible degree of accuracy is provided by using polyangulation since this system calculates the weighted least-square position of the space vehicle, thereby automatically weighting most heavily those sight lines which carry the least uncertainty.

Other objects and advantages of the invention will become apparent during the following discussion of the drawings, wherein:

FIG. 3 is a schematic diagram of the space vehicle illustrating the pattern of its scanning slits and the orientation thereof with respect to celestial bodies in the ecliptic plane;

FIGS. 4 and 4a show views of a mask having crossed slits of the type used in the present illustrative scanning system, and show waveforms of pulses resulting from intercepted celestial targets;

Figure 17:
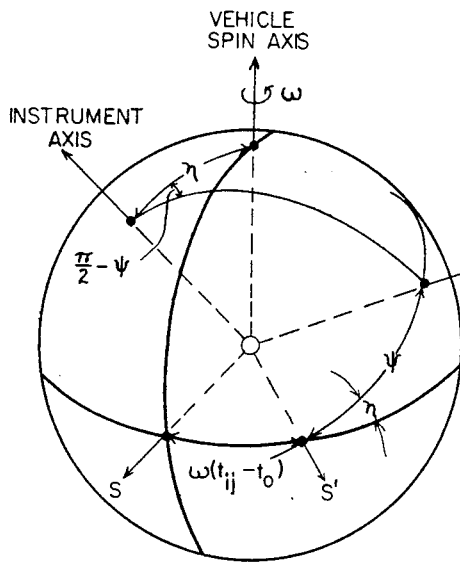
Figure 18:
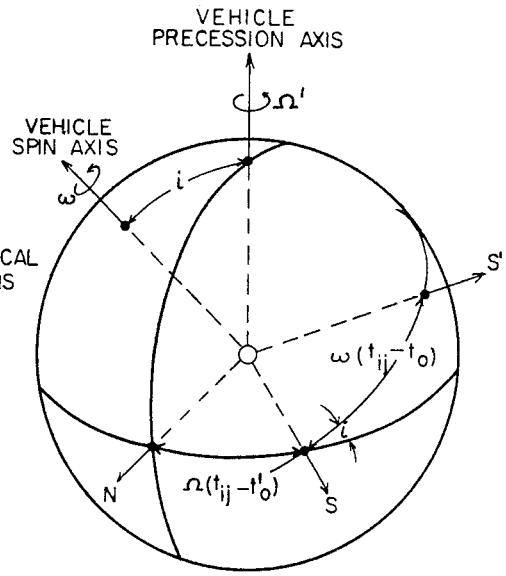
Figure 19:
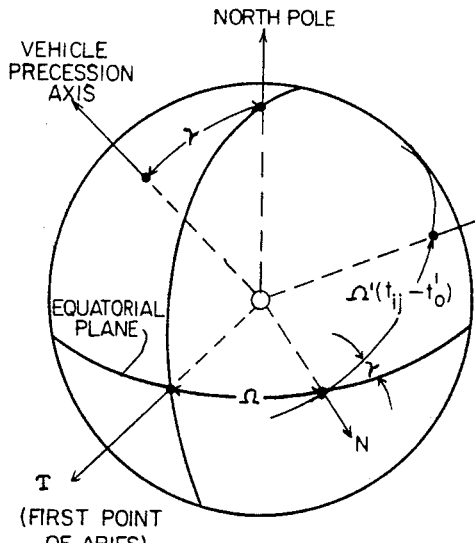
Figure 20:
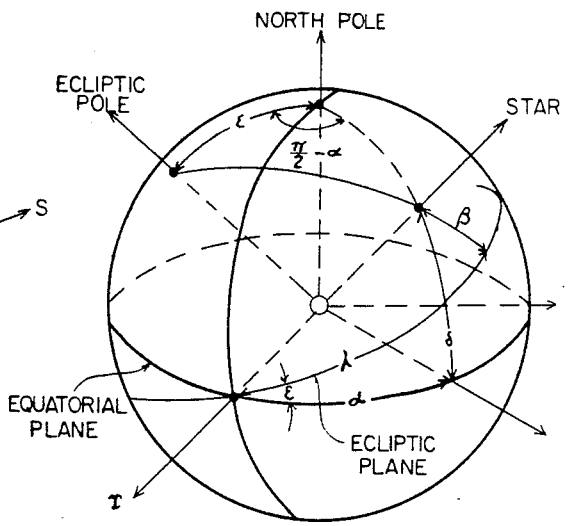
Figure 21:
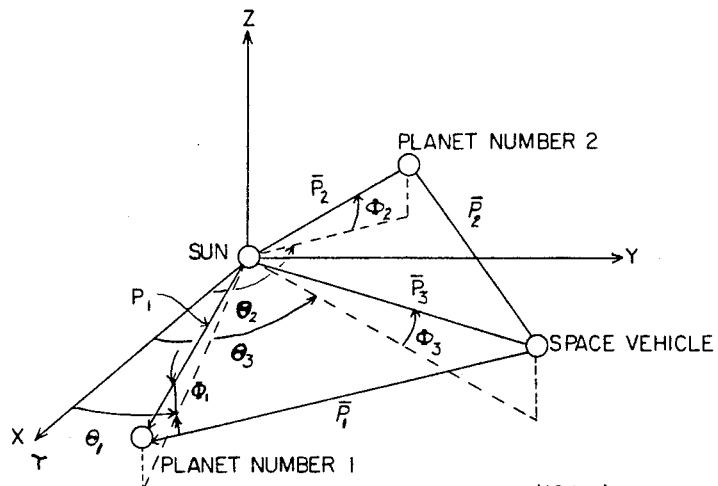
Figure 22:
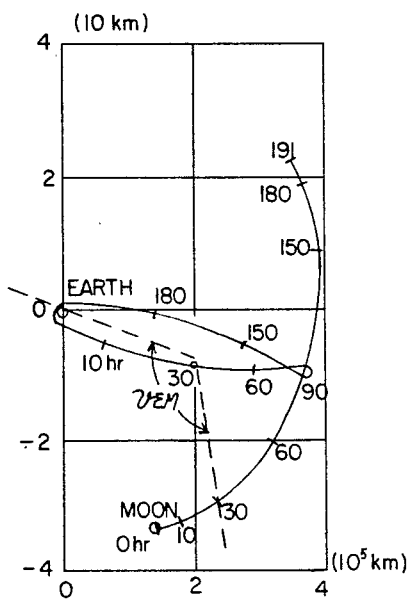
Figure 23:
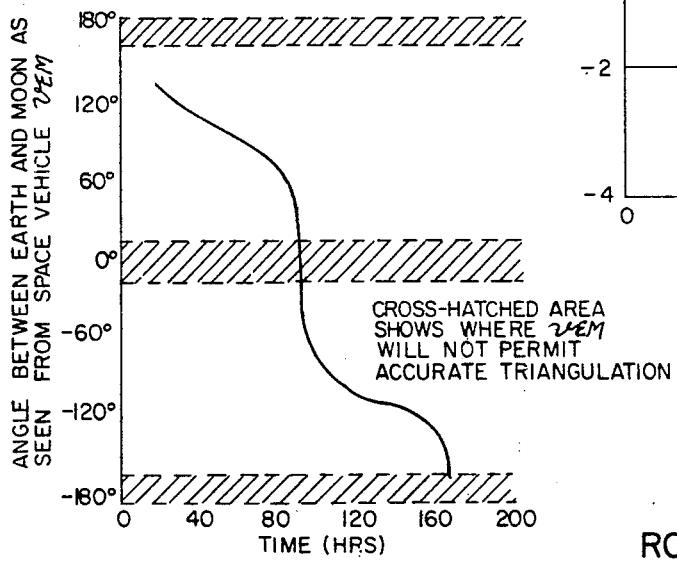
Figure 24:
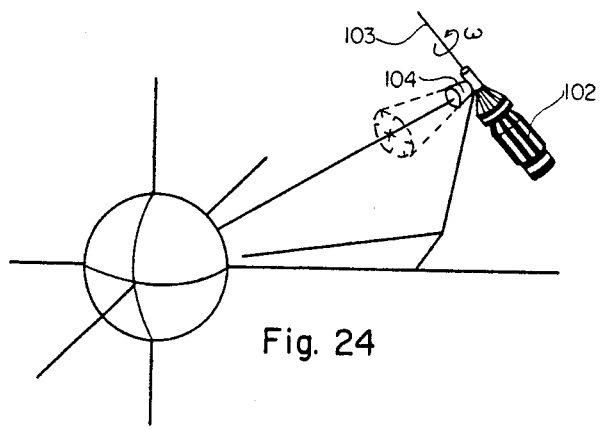
Figure 25:
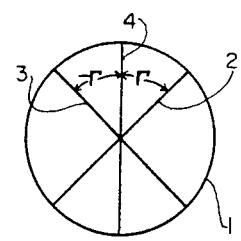
Figure 26:
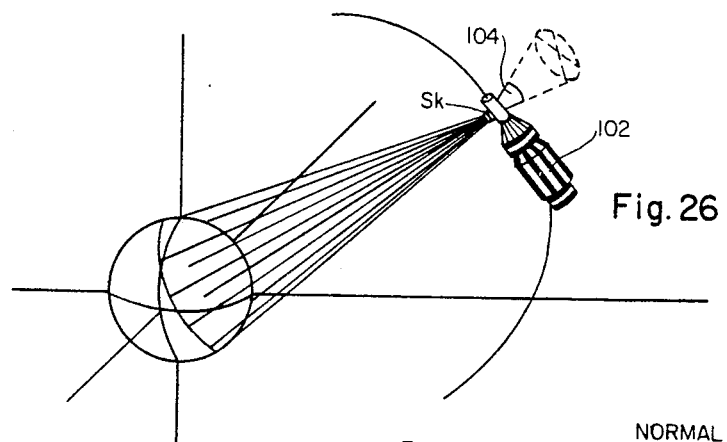
Figure 27:
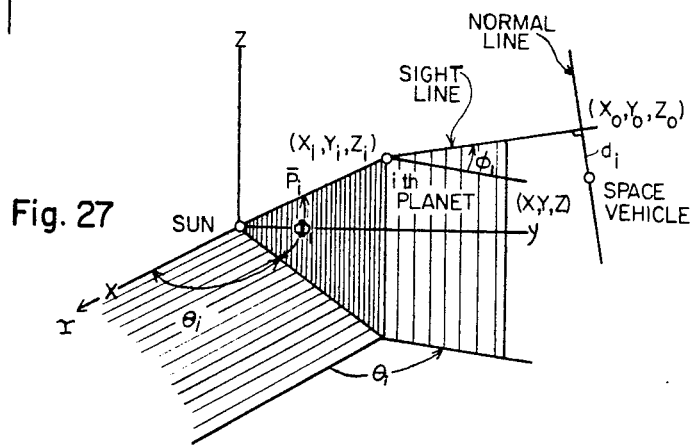
Figure 28:
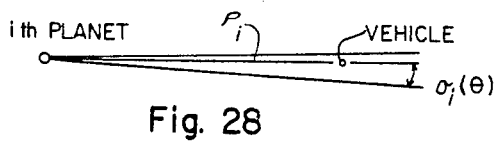

FIGS. 17, 18 and 19 are related diagrams showing the relationships between a vehicle frame of coordinates, and an astronomical coordinate frame for the case where misalignment and precession are present, FIG. 17 showing the instrument coordinate frame relative to the scan coordinate frame, FIG. 18 showing the scan coordinate frame relative to the precession coordinate frame, and FIG. 19 showing the precession coordinate frame relative to the astronomical coordinate frame;

FIG. 20 is a diagram showing the relationship between the ecliptic and the astronomical coordinate frames;

FIG. 21 is a diagram illustrating the relationship of the space vehicle to two planets of the solar system and the quantities used in formulating the navigational equations;

FIG. 22 is a diagram illustrating a projection of the trajectory of a vehicle during a trip around the moon onto the lunar orbital plane;

FIG. 23 is a diagram showing the angular separation of the earth and the moon as viewed from different positions of the vehicle therebetween;

FIG. 24 is a diagram illustrating a technique for determining distance of a vehicle from a nearby planet;

FIG. 25 is a diagram of a slit geometry for use in carrying out the technique shown in FIG. 24;

FIG. 26 is a diagram illustrating another technique for use when navigating close to a planet;

FIG. 27 is a diagram illustrating the computing of the position of a vehicle using the polyangulation technique; and FIG. 28 is a diagram illustrating the effect of an angular error in the measurement of position of a planet upon the computed error in the position of the vehicle.

Figure 1:
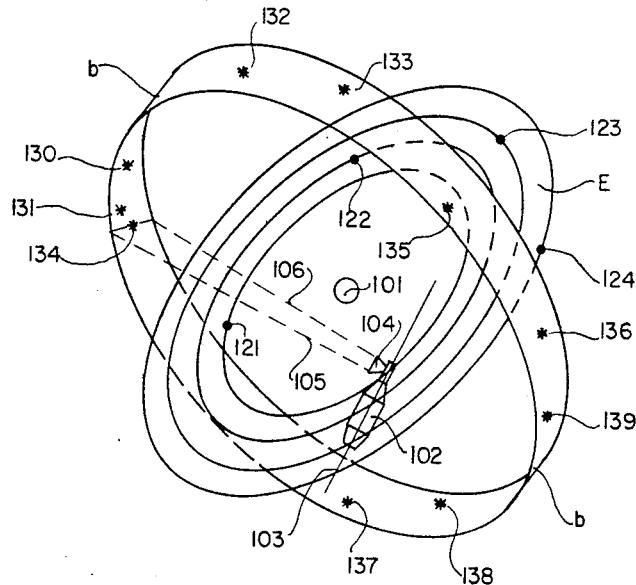
FIG. 1 is a schematic diagram showing a space vehicle equipped with the present system for determining the attitude of its axis with reference to a plurality of stars in a scanned sector.

Referring now to the drawings, FIG. 1 shows a schematic diagram representing our solar system including the sun 101 in the center thereof, and including a plurality of planets 121, 122, 123 and 124 in orbit therearound. As is well-known in astronomy, our solar system comprises a very small system with other stars and galaxies surrounding it. A narrow sector of space has been illustrated as a band $b$ having an axis which is inclined with respect to the ecliptic plane E formed by the planetary orbits of our solar system, and this narrow band $b$ including a plurality of stars 130, 131, 132, 133, 134, 135, 136, 137, 138, and 139. It should be emphasized that the diameter of this band is almost infinitely large as compared with the diameter of the panetary orbits, even though it is not possible to show this for purposes of illustration in FIG. 1. FIG. 1 also shows a space vehicle 102 having an axis 103 which comprises the axis of symmetry of the vehicle and also in this illustration the axis of an optical scanner 104 designed to rotate thereabout and scan the band $b$. The optical scanner 104 will be described in greater detail in connection with FIGS. 5, 6, and 7 of the drawings, but for present purposes it is sufficient to state that the scanner rotates around the axis 103 either as an integral part of the space vehicle in case this vehicle is spin-stabilized about the axis 103, or alternatively the optical scanning system 104 can be rotated about the axis 103 by means of a motor which provides it with rotation independent of the motion of the body of the vehicle 102, within the broad definition of "vehicle" given near the beginning of this specification.

As stated in the objects of the invention, it is the purpose of the present method and system to determine at any time the attitude of the vehicle in space and/or its location in the ecliptic plane E without any prior knowledge of the position of the vehicle. In general, when the vehicle 102 is ready to determine its attitude in space, it uses the stars rather than planets since there is a continuous band of stars which can be scanned by the optical scanner 104 when spinning around the axis 103 regardless of the attitude of that axis with respect to stars or with respect to the ecliptic plane E.

Assuming that the initial attitude of the axis 103 is unknown, there is no point in trying to use planets in the ecliptic plane to determine such orientation when the optical scanner 104 is not necessarily scanning in the ecliptic plane E and therefore may not see any planets whatever within its field of view during initial scanning. The angle subtended by the field of view of the optical system and represented by the two dashed lines 105 and 106 must be made wide enough that, no matter what the attitude of the axis in space, there will always be at least three stars of adequate brightness scanned within the field of view during any scanning rotation of the instrument. On the other hand, it is desirable that this angle be kept to a minimum consistent with the above requirements because of the fact that excessive widening of the angle of the field of view will result in the inclusion of a plurality of spurious images which are not needed for the determination of attitude and which only complicate the computations which must be conducted by the computer as discussed below in connection with this point.

Figure 2:
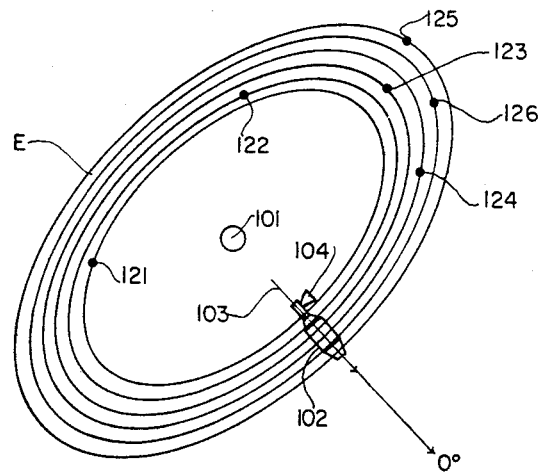
FIG. 2 is a schematic diagram of the space vehicle scanning the ecliptic plane with its axis disposed substantially normal thereto.

The information obtained by scanning the sector shown in FIG. 1 and including the stars 130 through 139, inclusive, is fed into an electronic digital computer, FIG. 14, and the output thereof provides information as to the attitude of the axis 103, and therefore of the vehicle 102, as will hereinafter more fully be discussed. When such information has been obtained the next step in the navigation of the vehicle will be to have the vehicle issue corrective thrusts which will change the attitude of the axis 103 and dispose this axis perpendicular to the ecliptic plane E as shown in FIG. 2. The motors for issuing the thrusts are not shown herein but are assumed to comprise part of the space vehicle itself.

The showing in FIG. 2 assumes that these thrusts have been provided to orient the axis 103 perpendicular to the ecliptic plane and that the space vehicle has now been stabilized substantially in this position by some suitable means carried on board the vehicle 102. It is sufficient if the axis 103 can be held in this position with respect to the ecliptic plane for a few seconds or preferably a minute or so. This will provide sufficient time for the optical system 104 to scan the ecliptic plane and the nearby space on each side thereof.

In order to determine the attitude of the vehicle in space, as set forth above, the stars within the narrow band $b$ shown in FIG. 1 were scanned, and the planets ignored, even to the point of providing special means as will be hereinafter discussed for discriminating against signals obtained by the scanning of planets. It is the purpose of the scanning performed in connection with the showing of FIG. 2 to scan the planets, rather than the stars, for the purpose of obtaining information which can be used to compute the location of the space vehicle within the ecliptic plane. Reference to the ecliptic plane as made in this specification is only an approximation not intended to limit the scanning to a plane which is geometrically perfect, but only to an area of space which lies near the ecliptic plane. Here again, in this application the viewing angle of the optical system 104 must be wide enough that the equipment will scan space on both sides of the ecliptic plane since the planes are not located precisely therein. This is necessary in order to provide a system which can use substantially any of the planets in the solar system, provided the instantaneous position of the space vehicle is some distance from the planet. There will, of course, be times when the space vehicle is near a planet but is located in such a position with respect thereto that the planet has passed outside the field of view of the optical system. However, at any time, it is expected that at least six planets will be visible to the scanning optical system of the present apparatus when oriented to the attitude shown in FIG. 2.

As stated above, in the most general case of use of the present invention, the stars will be used to determine the attitude of the axis of rotation 103 in space; this information will be used to determine the nature of corrective thrusts required to place the axis 103 perpendicular to the ecliptic plane E; and then a subsequent and separate scanning process will be carried out again in which the optical instrument 104 will be rotated at least through another 360 degrees of rotation in order to determine relative positions of the planets in the ecliptic plane within the field of view of the instrument. From this second scanning step the location of the space vehicle in the ecliptic plane can be determined.

FIG. 3 is similar to FIGS. 1 and 2 in that it shows a space vehicle 102 having an optical scanning system 104 which rotates around an axis 103. This figure schematically shows in dashed lines two crossed slits 2 and 3 of a mask 1 forming a part of the optical system. This showing represents one possible mask configuration embodiment, of which there are many, for example, V-shaped instead of X-shaped configurations.

Figure 5:
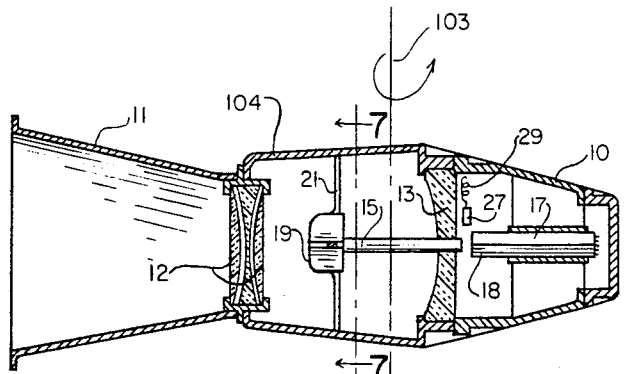
FIG. 5 is an axial section view through a working embodiment of an optical scanning head suitable for use in the present system.
Figure 6:
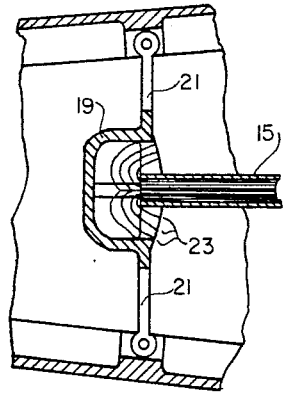
FIG. 6 is an enlarged sectional view taken along line 6—6 of FIG. 7.
Figure 7:
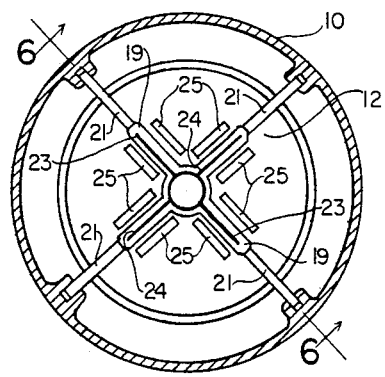
FIG. 7 is an enlarged cross-sectional view taken along line 7—7 of FIG. 5.

In FIG. 4a a dotted image is shown representing the planet 124 in two different positions. As the optical system scans, the planet 124 will come into view first in the slit 3, then will pass through a masked area between the two slits, and then will show up again near the position 124′ of the slit 2. This crossed-slit mask is used in combination with phototube means to perform measurements including angular separations and intensities of the bodies scanned in order to identify the bodies, which identities can be used to determine attitude and/or position. The optical sensor is mounted on the space vehicle and rotated in such a manner that the star field passes over the mask 1 because it is focused thereon by a lens system 12 which will be described in connection with FIGS. 5, 6, and 7 showing a working embodiment of the scanner 104. Because of the fact that there are two slits, each celestial image provides two time-spaced output pulses at the photomultiplier means unless it passes through the intersection of the slits. The interval between the two pulses indicates displacement from this intersection normal to the azimuth direction, and means is provided for determining the direction of such displacement as will be hereinafter described. It will of course be recognized that if two stars pass the slits at approximately the same time, there may be confusion as to which of the four pulses belong together as representative of a single target. The actual pairing of pulses is done by the computer on the basis of light intensity, as represented by the amount of current passing through the phototube means each time an image falls thereon. When the energy from a star or planet falls on one of the slits, the photomultiplier means detects this radiation, and by measuring the times of occurrence of these pulses the relative separations of the celestial bodies can be determined. This requires the obtaining of one or two slit scan-time measurements for each body. For the slit arrangement shown in FIG. 4 the summing of related and paired pulse-time measurements yields the azimuth position of the target while the differencing of these two time measurements yields its elevational position. The positions in the case of planets are derived by measurement of the positions of their illuminated planetary limbs since they are not mere point sources of light. Since the approximate location of the space vehicle will ordinarily be known, a correction for the separation between the planetary limb and the center of the planet can then be introduced based on the diameter and range of the planet as viewed from the vehicle. Should the scanning direction be such that the terminator is approached first, rather than the illuminated limb, the times of decay will be measured rather than the rise times of the pulses as shown in FIG. 4a. The pulse shapes beneath the illustrated masks 1 show the differences between rise times and decay times depending on the type of body viewed and the direction of approach toward it. The logic of the computer is used to decide whether the rise times or decay times are to be used for planetary transits.

Referring now to FIGS. 5, 6, and 7, these figures illustrate one possible embodiment of an optical scanner 104 comprising a head including a housing 10 having a light shield 11 and having a suitable system of lenses 12 for focusing the images of the stars and planets on the mirror 13. The reflections from the mirror are collected at the focal plane by the ends of a plurality of optical fibers 23 and 24 which are located along the actually comprise the slits in the mask as shown in the detailed view of FIGS. 6 and 7. These optical fibers are grouped into separate bundles respectively and extend through the center of the mirror terminating opposite the ends of two photomultiplier tubes 17 and 18. In order to determine whether a target crossed the slits above or below their intersection, it is convenient to use two photomultiplier tubes 17 and 18 so that the group of fibers comprising the slit 23 are directed toward the tube 17, and the group of fibers comprising the slit 24 are directed toward the tube 18. The scanner delivers separate outputs from the tubes 17 and 18 to the computer so that it can determine which slit was intersected first by a target. The light-receiving ends of the fibers 23 and 24 extend into a housing 19 which is supported on a set of spider-type legs 21 as shown in FIGS. 6 and 7. The housing 19 is made in the shape of a cross and is deep enough to permit the fibers to be bent around a gradual radius and aimed back in the direction of the mirror through a tube 15. In other words, the light is reflected from the mirror 13, strikes the ends of the glass fibers 23 and 24, and is then conducted through the glass fibers and directed toward the respective ends of the photomultiplier tubes 17 and 18 located thereopposite.

The lens 12 and the housing 19 establish the angular field of view over which the sensor scans as it is rotated about the axis 103. In selecting the angular field of view, it is necessary to compromise between two factors, namely the necessity of detecting a useful and adequate number of bright stars on each rotation of the scanning system, and on the other hand, the desire to restrict the field of view as much as possible in order to reduce the amount of background radiation from unwanted signal sources scanned by the optical system. Based on the distribution of stars, and upon the distances of some planets from the means ecliptic plane, a subtended angle of approximately 26 degrees between the lines 105 and 106, FIG. 1, is practical. In addition, in the electronic portions of the system, various biases are used in order to provide thresholds which discriminate against targets outside of the intensity range to which the present system is intended to respond. Moreover, there is the further problem arising from the fact that the sun is so bright that its image can damage the photomultiplier tubes. The fact that the sun 101 is in the center of the ecliptic plane E means that it will, in fact, pass through the field of vision of the instrument usually once for each revolution thereof after the axis 103 has been oriented normal to the ecliptic plane. The selection of the 26 degree field of view makes at least three stars of 2.3 magnitude visible in each sector of space which can be scanned.

Although each slit subtends an angle of 30 degrees, the the camera viewing angle as measured in the elevation direction will be somewhat less than 30 degrees because of the fact that the slits are inclined and crossed so as to permit the detection of elevational as well as azimuth information. Where the slits in the mask are crossed orthogonally the width of the scanned field will be only 21.2 degrees. However, with a slight, though acceptable, degradation in elevational accuracy, this field can be increased to 26 degrees by cutting down the angle between the slits from 90 degrees to about 60 degrees, as illustrated in FIG. 4. FIG. 4 differs from FIG. 7 because in the latter the slits are normal to each other, and therefore represent a somewhat modified embodiment of the slit configuration.

A preferred optical system comprises a camera having an aperture of 4 inches, a field of view of thirty degrees, the $f$ number of the lens being 1. The optical system has an effective focal length of 4 inches, a diameter of 5½ inches for the mirror, and a diameter of 2 inches for the focal surface. This focal surface can be made to conform with whatever contour will minimize the optical aberrations, and the diameter of the blur circle over the entire field of view should be equal to or less than 40 seconds of arc. Since coma and most of the aberrations of the optical system will be symmetrical about a radial line, the present system of radial slits tends to eliminate their effects.

Though the embodiment illustrated is of the reflective optical system type, a refractive system will serve satisfactorily. Moreover, the photosensitive means can be placed directly behind the slits, thereby eliminating the conductive fibers. In either case, however, the slits should be made to conform with the focal surface of the optical system.

Although a mask having slits is illustrated in FIG. 4, in the practical embodiment of the optical system shown in FIGS. 5, 6 and 7 the slits really comprise the ends of the glass fibers 23 and 24 extending out of the housing 19 and facing toward the mirror 13. The use of the optical fibers 23 and 24 to collect each image and conduct it to the photomultipliers has several important advantages. In the first place, small-diameter photocathodes can be used so that the dark current is minimized. In addition, the light intensity over a relatively small cathode area can be made substantially uniform. This is very important when it is remembered that the intensities of the stars and planets will be used to provide additional information serving to pair the output pulses and also to assist in identifying the stars. In the second place, small phototubes can be accessibly placed so that they can be relatively easily changed, especially if some simple system is provided for substituting one photomultiplier for another by the performance of a simple operation which can be accomplished during the flight. In the present disclosure no means is shown for making such a replacement.

When an image impinges on the end of one or more of the fibers 23 or 24 which are positioned at the focal surface of the instrument in the housing 19, the image will be transmitted along the transparent dielectric cylinder comprising the optical fiber by a succession of internal reflections within the illuminated fiber. Provided the radius of curvature of the bends in the glass fibers is not too small, no less than about 20 times the diameter of a fiber, the light can then be piped to any place where it is convenient to mount the photomultipliers 17 and 18. The amount of energy absorbed by the material of the fibers increases with increasing fiber length, and therefore it is desirable to make the fibers as short as is consistent with satisfactory geometry and relatively large-diameter bends. The size of the housing 19 and the size of the hole in the center of the mirror to permit the tube 15 to pass through can be made small enough so that there is only about a 4 degree dead spot at the center of the instrument. Other designs which carry the fibers out along the spiders 21 are possible which completely eliminate this dead spot. The glass fibers 23 and 24 are not equal in diameter to the width of the slits, but rather there are a plurality of fiber ends distributed across this width. By making the diameter of the glass fibers small, perhaps as small as 5 or 10 microns, there will be very little loss in resolution. Moreover, since all the fibers in either group are pointed at the same multiplier cathode, it does not matter if a certain amount of light is transferred from one fiber to another within the same group as the light passes therethrough.

As mentioned above, it is necessary to protect the photomultipliers 17 and 18 from direct sunlight, and in order to accomplish this a plurality of silicon solar cells 25 are mounted at the sides of the slits so that the sunlight must necessarily reach at least one of these cells before it actually falls upon a slit. The power developed by the solar cells 25 is used to actuate a solenoid 29 to drop a shutter 27 down between the ends of the glass fibers in the tube 15 and the photomultiplier tubes 17 and 18 The diameter of the sun is so great that there will be a signal continuously available for all positions of the solar image when it is in the neighborhood of a slit. If the solar cells 25 are accurately fixed, the time of build-up of this signal can be noted, and a relative angular determination of the sun's position can be computed from this information.

In view of the fact that the optical system measures the angle between successive stars by measuring the times at which the stars pass the slits in the focal plane, it is important that the rate of rotation of the optical system about the axis 103 be substantially constant over a sufficient period of time to complete at least one revolution of the optical system. Rotation periods of 10 to 100 seconds appear to be appropriate for this type of equipment, but the shorter of these rotation periods could not very well be used if the optical system were rigidly mounted to rotate in unison with the space vehicle, especially if it were a manned space vehicle. It is therefore desirable to provide an alternative mounting arrangement for use on an inertially stabilized vehicle.

In this form, the optical system is journaled on the vehicle in such a way that it can rotate about its own rotation axis which may or may not correspond with a selected reference axis of the vehicle. In this type of mounting, which is not illustrated herein, a small flywheel may be provided which is journaled on the axis of instrument rotation and is provided with the same annular momentum as the optical system to be rotated. A small motor can be provided for turning the optical system with respect to this flywheel about the instrument rotation axis, the optical system and the flywheel being rotated in opposite directions. The optical system can thus independently scan a sector and it is only necessary that the vehicle be stable enough in space to maintain the instrument rotation axis substantially constant for one period of rotation of the optical system. Since the flywheel turns in one direction and the optical system in the other, and since their angular momenta are made identical, the effect is then such as to isolate the motions of the optical system from the main body of the space vehicle so that the torque required to rotate the optical system will not be applied to the vehicle itself. Clock means, to be hereinafter discussed, are then provided for the determination of the rate of actual scanning of the optical system, and for the determination of angular separations between successive targets as based on this known rate of scanning. The rate of actual scanning of the optical system will always be a composite of the instrument rotation rate relative to the vehicle, which may in some practical cases be zero, plus the motion of the vehicle itself relative to the celestial body coordinates, which motion in other practical cases may be equal to zero. These motions are hereinafter considered in greater detail.

THE METHOD

In order to understand the nature of the computers which cooperate with the above-discussed optical system, it is necessary to understand the present method and the problems involved therein, and therefore it is desirable to discuss these aspects in a general way, leaving the description of computers and associated circuits until later.

As stated above, the present method involves identifying various stars and/or planets by determining their intensities, and then determining the angles therebetween. Broadly, this method involves the rejection of stars having a brightness fainter than a certain magnitude, and during certain functions of the present apparatus it is also desirable to reject some of the brighter planets, as well as the image of the sun. Thus, the first step in the method is to select a certain range of intensities which will be used. Targets are selected by rotating the field of view of the optical system to find targets having intensities within a predetermined range. The process then involves the step of obtaining angular-separation information for these targets based on the time intervals between selected target arrivals, which is a function of optical system rotation relative to the celestial bodies. Next, the method involves the conversion of time-of-arrival information to angular separations in degrees between the selected celestial targets. Finally, these angular separations are compared with stored angular-separation data for all of the celestial bodies having magnitudes falling within the brightness range selected, and when coincidence is obtained for both the specific intensities and the measured angular separations, the particular stars scanned are thereby identified. As an ancillary step in the method, a consistency check is made by determining intensity and angular separations with respect to at least one additional target. In cases where a computer is provided aboard the vehicle, positional determination can be made by solving a set of matrix equations in the manner to be hereinafter discussed by performing least-square polyangulation calculations, but it is also within the scope of this invention to telemeter the information obtained by the optical system to ground-based computers which perform the computations and complete the consistency check.

STAR IDENTIFICATION WHILE DETERMINING ATTITUDE

As we explained above, the present system includes a wide-angle camera having two crossed scanning slits which are located in the focal plane of the camera. As the camera scans across the sky, the times of appearance and magnitudes of the various stars crossing the field of view are measured. This information can be used to identify the various stars so that the attitude of the space vehicle can be determined.

Briefly, the sequence of identification of the brightest three stars involves the following steps after scanning:
(1) Discard all but the three brightest stars having magnitudes less than 0.0;
(2) Calculate angular separation of the brightest two stars based on instrument scanning measurements;
(3) Institute a computer search among cataloged stars of similar brightness;
(4) Compare measured angular separations with cataloged separations;
(5) If the separation compares within one minute of arc, the first two stars are identified; if not, discard one star and start a new search using a substituted star;
(6) Make a consistency check by repeating the process using one of the identified stars and still another star;
(7) If the consistency check is satisfied, identification is complete; if not, go back to step (4) and continue with a new search.

Figure 8:
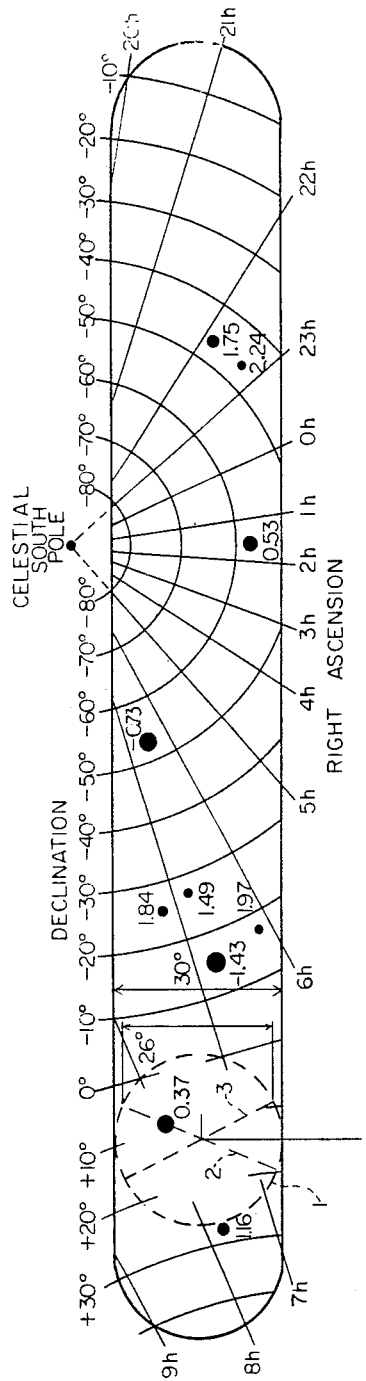
FIG. 8 is a schematic diagram showing as a developed strip one possible sector of space scanned by the present system and showing a distribution of celestial bodies therein.
Figure 9:
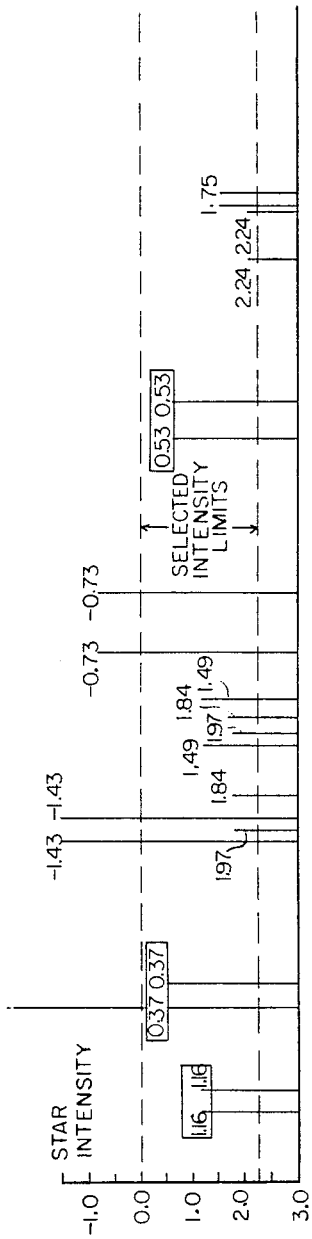
FIG. 9 is a schematic diagram showing a plurality of pulse signals obtained when the sector of space shown in FIG. 8 is scanned by crossed-slit geometry as shown in dotted lines in that figure.

FIGS. 8 and 9 illustrate the technique of star identification. Assuming that the camera scans the specific region of the sky identified by the illustrated lines of right ascension and declination, the scan axis has an inclination to the equatorial plane of the celestial sphere of 25 degrees and the scanning plane intersects the celestial equator at a celestial longitude of 7 hours 20 minutes. For reasons which concern, in a general case, obscuration of part of the sky due to the nearness of the earth, and which will be discussed later, it is assumed that the search region is 223 degrees in length and not a full 360 degrees. With scanning slits positioned at 60 degrees mutual angular separation, FIG. 4, the width of the search region is 26 degrees as is shown in FIG. 8 by the arc of declination intercepted approximately along the one-hour line.

As will be discussed hereinafter, the present system includes means for setting threshold limits based on target brightness, and in this example the respective lower and upper limits were set at 2.3 magnitude and 0 magnitude so that intensities which are outside these limits are disregarded. The establishment of the upper limit is purely arbitrary but was selected at 0 magnitude to minimize the number of planetary false targets which might be detected while intending to scan only the stars. Of course, this also has the effect of eliminating three or four of the brighter stars, but it results in a more rapid computer sequence with less danger of a false star identification during the initial attempt to identify the first two stars. The lower limit of 2.3 was established on the basis that there will always be at least three acceptable stars in the scanned 26-degree-wide region of the sky which are brighter than about 2.3 magnitude.

The computer, to be more fully discussed later, is programed to select the brightest three stars within the acceptable intensity limits, and to attempt to identify them by a comparison sequence as outlined below. The three stars identified in FIG. 8 are marked by rectangular boxes surrounding their brightnesses in FIG. 9.

The magnitudes and general catalog numbers of the various stars shown in FIG. 8 are as given in the following listing:

| General Catalog Number | Magnitude | Comments |
| --- | --- | --- |
| 8533 | −1.43 | } Brighter than upper intensity limit. |
| 8302 | −0.73 | |
| 10277 | 0.37 | } Brightest set of stars falling within intensity limits. |
| 1979 | 0.53 | |
| 10438 | 1.16 | |
| 9188 | 1.49 | } Usable if brightest 3 stars are too close to 0° or 180° in separation. |
| 30942 | 1.75 | |
| 9433 | 1.84 | } Never used because of proximity to brighter stars. |
| 3223 | 1.97 | |
| 31685 | 2.24 | |

The last three stars in the table have sufficient intensity to be included in the list, but are so close to other brighter stars that they will never be used. As will be seen later, the fact that perhaps 20% of the weaker stars lie close to relatively bright stars has a very favorable effect on the ambiguity problem because their separation and intensities need never be considered. The use on some occasions of the less bright stars arises from the fact that certains regions of the sky are lacking in brighter stars.

Having selected three stars, the next step in the process is to determine angular separations as shown in FIG. 9. According to the present method the angular separations are not carried in the computer memory, but are generated from the catalog of star positions for each star pair. The angular separation based on the star catalog is then compared with the angular separation based on the measured relative positions of the stars. The test comparisons which must be made are limited to those stars which have magnitudes which are similar to the measured magnitudes. The instrument errors in the measured magnitudes can be limited to about ±5%, and therefore the number of test comparisons will be very few—usually less than ten. Thus the problem of storing a very large number of angular differences has been replaced with that of calculating ten angular differences. The selection of the brightest three stars is only of advantage from the viewpoint of the ease of identification based on stored magnitude data.

Having mentioned broadly some main considerations relating to the star identification technique, the next problem is one of assigning quantitative values to the following parameters:

Namely (2) the required accuracy of the angular separation measurement; and (3) the required accuracy of the intensity measurement.

These requirements must be satisfied in such a manner that at least three uniquely identifiable stars are detected for all scanning geometries.

Since the attitude determination system will be used on earth satellites as well as space vehicles, the effect of earth obscuration must be considered. The orientation of the vehicle is assumed to be completely random initially, and therefore the effect of earth obscuration is not possible to predict. The worst case for the system under consideration is that in which the scan plane passes through the center of the earth. In this case slightly less than half of the potentially observable region of the sky may be obscured, with the amount of obscuration decreasing as the satellite altitude increases.

In the present system, no matter what the orientation of the vehicle at the time of inertial stabilization, the scan cycle will carry the camera through an open sky region for at least half of its motion.

An advantage can be gained in terms of earth obscuration if there are provided additional shutters (not shown) at the ends of the optical fibers 23 and 24, which shutters selectively cut out the upper or the lower scanning slits independently. This can be easily instrumented and would provide a means of collecting data from half of the field of view while the other half is illuminated by solar energy reflected from the earth or its atmosphere.

In connection with the establishment of a relationship between the camera field of view and the number of stars required to provide at least three stars for all orientations of the axis 103 despite serious earth obscuration, a study of the brightest 100 stars and their distribution in the sky leads to the following conclusions:

First, if the vehicle is at a considerable distance from a planet, a camera with a 30° field of view can detect at least three stars of sufficient brightness for all orientations of the axis about which the instrument scans, provided we use 50 stars taken from an astronomical table summarizing positions and magnitudes of the stars; and Second, if the vehicle is very close to a planet, the list must then include about 75 stars. However, about 15 of these stars will never be used because of their proximity to brighter stars.

Assuming the use of 50 stars, and because of the less-than-perfect accuracy with which this system will measure angular separations, there will be about 128 of the 1225 angular separations which will be ambiguous if they are measured to an accuracy of 1 minute of arc. Thus, there is a need for additional information, and in the present system it is proposed that this be supplied by means of the intensity measurement. The question then arises as to how accurate must this intensity measurement be in order to remove all ambiguities.

A study was made of the differences in magnitude between star pairs having similar angular separations. When all pairs of stars in which the magnitudes of the members of one pair differed from those of the other pair by an amount exceeding 0.2 magnitude were neglected (equivalent to assuming that the accuracy of each magnitude measurement was ±10%), only 15 of the original 128 angular separations remain ambiguous. As a matter of fact, some of these combinations would never be measured on a practical basis.

As a result of these determinations it is concluded that it is both possible and practical to measure angular separations to an accuracy of ±1.0 minute of arc; that it is adequate to measure star intensities to an accuracy of ±.07 magnitude; and therefore that it is practical for the present apparatus to be expected to uniquely identify any of the star pairs arising from the 50 brightest stars which are actually needed for attitude determination. Acuses a third star for a consistency check by running a second set of determinations. If the consistency check is not satisfied, it will only be necessary to initiate a new computer search. The existence of variable aberrations, in accurate motions, variable star intensity, variable planet intensity and position, all tend to create conditions in which a mistaken initial identification of the first two stars can result. However, if the logical capability of the computer is properly used, this will not result in a basic error in the identification but will merely cause a slight increase in the time required to achieve a unique identification.

A table of the star magnitudes and angular separations is not included in this specification because of the general availability of such information in astronomical catalogs.

PROCESSING SIGNALS FROM THE OPTICAL SYSTEM

After the light passes through the dielectric fibers 23 and 24 it impinges on the face of the photomultipliers 17 and 18. Suitable circuits must be provided to amplify the resulting photomultiplier pulse signals obtained from targets, for instance, as shown in FIG. 9, to measure the time at which each reaches a predetermined intensity level, to measure the intensity itself, and to transmit these values in digital form to a computer. The problem of detection of the stars includes within itself considerations of background noise, slit width, protection of the detector, detector-type selection, form of signal pulse, photomultiplier dark current, and scanning speed. These problems will be considered herein.

The background noise introduced by the large number of low intensity stars scattered throughout the sky will usually not be troublesome. However, occasionally an anomalous pulse form will be received due to two bright stars entering the slits at the same time and these signals will be rejected. The probability of this occurrence increases with increasing slit width and therefore one is motivated to keep the slits as narrow as possible. The present total slit width is 2 minutes of arc and 2×30 degrees long. The total area is therefore 2 square degrees. Taking the worst case for zero galactic longitude, one would expect to find about two stars of magnitude less than 8 in this area at any one time. On the average these two starts will be less intense than 7th magnitude stars. Since this is about 5 magnitudes less than the lower threshold limit (2.3), on the average the background radiation due to stellar targets brighter than 8th magnitude will be only 1% or 2% of the signal.

The above figures indicate that on the average there will be very few strong signal events to interfere with pulse time or photometric measurements. The question remains as to what background the average starlight from the entire sky contributes. It has been calculated that the total background is equivalent to 640 1st magnitude stars. Of course, the present detection system itself is designed to detect 50 to 75 stars which probably have an average magnitude of about 1.0, and these stars cannot be considered as part of the background flux. Assuming a background equivalent to 550 1st magnitude stars, there results the following line of reasoning. There are 41,253 square degrees in the sky and therefore the sky may be divided into about 20,600 regions equal in size to the present total slit area. 20,600 stars of magnitude 4.9 will provide as much radiation as 550 1st magnitude stars. Since the equipment eliminates stars less than 2nd magnitude in brightness, the integrated background on the average will supply a signal of only 7% of the brightness of the weakest star on which the system will be basing scan time measurements. While this background level will not normally be troublesome, particularly in view of the fact that the system will be measuring changes in intensity to determine scan time rather than the absolute intensity itself, it is sufficiently large to discourage significant increases in the width or length of the slits.

Since it is by measurements of times of arrival that star separation angles are derived, it is important that this process be examined in more detail. The presence or absence of a star in the image slit is determined by a rise or fall of output current in the photomultiplier tubes 17 and 18. It is basically a correlation of time of receipt of such current signals with camera angle, as shown in FIG. 9, that must be made.

An examination of the image geometry on the image plane will suggest how signal shape may be derived. The approximate shape of the intensity envelope of the image as a function of angle from the image center can be predicated on an assumed Gaussian distribution, as a reasonable approximation.

The relationship between time and angle is a simple function, i.e., $\omega t$, where $\omega$ is the rotation rate of the optical system relative to the stars. If one complete revolution is assumed every 50 seconds of time, then a rotation of 432 minutes of arc per second of time will be the velocity of the slit, or 38.6 microseconds of time per second of arc. Assuming a Gaussian distribution, the rise to 100% will take 1540 μs., approximately (assuming a blur circle 40 seconds of arc in diameter).

The signal outputs from the photomultipliers will have shapes which are functions of the input radiant energy distribution, of the scan-rate, and of the parameters of the electronic circuits associated with detection of the signals. Examples of photomultipliers adequate for the present analysis are the EMI 9526B and the RCA 921A.

The total radiant power received by the optical system will be $$P_r = (2.43 \times 10^{-10}) 10^{-0.4 m_v} \text{ lumens/cm.}^2$$

Assuming an optical aperture of 78.5 cm.² (4 inch diameter), the total power for a star of visual magnitude $m_v = 2$ will be $$P_r = (2.43 \times 10^{-10})(10^{-0.8})(78.5) = 3.02 \times 10^{-9} \text{ lumens}$$

It is recognized that this power is in the visual spectrum whereas considerably more power is available in the S11 spectrum of the photomultiplier. However, if the visual power is used in the calculations a conservative solution to the problem will result.

Overall sensitivity of a photomultiplier with 1600 volts will be 2000 microamperes/lumen with a dark current of 0.2 microampere. Output current with a 2nd magnitude star will then be, $$I_o = (2 \times 10^3)(3.02 \times 10^{-9}) = 6.04 \times 10^{-6} \text{ amperes}$$

Figure 10:
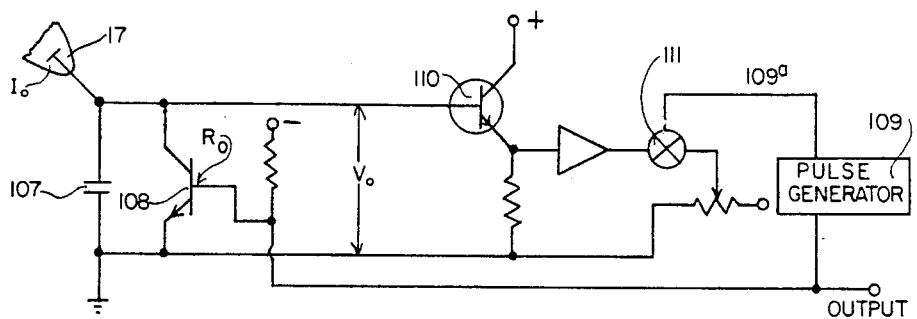
FIG. 10 is a schematic diagram showing a circuit for coupling a photosensitive means with a pulse generator for modulating the rate of pulse generation according to the amplitude of the output signals from the photosensitive means.

The equivalent electric output circuit of the photomultiplier shown in FIG. 10 may be assumed to be a current source $I_o$ shunted by a capacitor 107 and by an element 108 having a resistance with an output voltage $V_o$ thereacross. Assuming this equivalent circuit, an equation describing the output voltage $V_o$ can be written, assuming the photomultiplier is a constant current generator of current $I_o$. Then, $$\frac{V_o}{R_o} + C_o \frac{dV}{dt} = I_o$$

where $C_0$ is the capacity of capacitor 107, and $R_0$ is the resistance of the transistor 108. Solving this equation for the output voltage yields, $$V_o(t) = I_o R_o (1 - e^{-t/R_o C_o})$$

The time required for the voltage $V_o(t)$ to reach a certain selected value $V_f$ is $$t = R_o C_o \log_e \frac{1}{1 - \frac{V_f}{I_o R_o}} \quad (1)$$

A reasonable value of $V_f$ capable of adequate detection with transistor circuits is 0.2 volt, and $R_0$ will be 1 megohm. The value of $I_0$ is expected to vary between 4

μamps and 50 μamps and for these two values we obtain the times, $$t_4 = R_0C_0 \log_e 1.052 = R_0C_0(.0507)$$
$$t_{50} = R_0C_0 \log_e 1.003 = R_0C_0(.002)$$

and the ratio of $t_4$ to $t_{50}$ is approximately 25 allowing a range of intensity resolution of approximately 1 in 25 in star intensity, discounting, for the moment, the effects of noise and dark current in the photomultipliers. This circuit will therefore enable the system to measure the star intensity to an accuracy of about 4%. There are, of course, other errors in the star intensity measurement but they will be smaller than the above value. One of these errors results from a variation of the response characteristic of the photocathode with time and temperature. This will be calibrated using a standard signal source, or by relying on the ratios of the intensities of the stars rather than their absolute values. Another source of error relates to the random arrival of photons as a function of time.

Referring to the output circuit for the photomultiplier, FIG. 10, and noting from Equation 1 that the time required for the capacitor 107 to charge to the predetermined voltage $V_0$ is dependent on $I_0$, i.e., the greater $I_0$ the shorter will be $t$, it becomes apparent that an emitter-follower amplifier 110 can be connected to control a pulse generator 109 in such a way that as $I_0$ increases with radiant intensity input, the frequency at which the pulse generator 109 operates is made to increase. For a given set of conditions the pulse output frequency is then made proportional to input radiant intensity. The switch 111 selectively couples the control lead 109a either to an adjustable bias from the potentiometer 112, or to a level which is obtained from the emitter-follower 110 and depends upon the target intensity.

The star position in the slit may be determined by noting the change in frequency of this pulse generator 109 as the slit scans the star. At either edge, the frequency will decrease. By measuring the time interval between noted reductions in frequency and by averaging by dividing by 2, the star position in time relative to the scan time may be determined to within ±400 μs or ±13 seconds of arc, assuming the parameters used above.

The effects of thermal noise, shot noise, and noise generated by the transistor input impedances, as well as dark current and shot noise generated by the photomultipliers, can be integrated and smoothed by providing an effective 800 cycle bandwidth in the photomultiplier output circuits. The effects of such noise can be safely assumed constant over the time of slit transit and will therefore affect star magnitude or radiant intensity measurements by an amount proportional to $I_0/I_n$ where $I_n$ is the equivalent noise current generated at the photomultiplier outputs by a star. The ratio of $I_0/I_n$ is estimated to be greater than 15 so that the frequency generated for the output pulses will be as determined by Equation 1. Discrimination can therefore be easily accomplished by the computer.

The low pulse frequency, less than 600 c.p.s., generated by noise current will be superimposed on a 16 k.c. signal (from the pulse generator 109 when a star is fully in a slit) and can cause an additional error in position determination estimated to be at most an additional 400 μs or 13 seconds of arc so that the R.M.S. error of star position determination due to all errors in generation of signals for the computer and clock will be about 20 seconds of arc.

Figure 11:
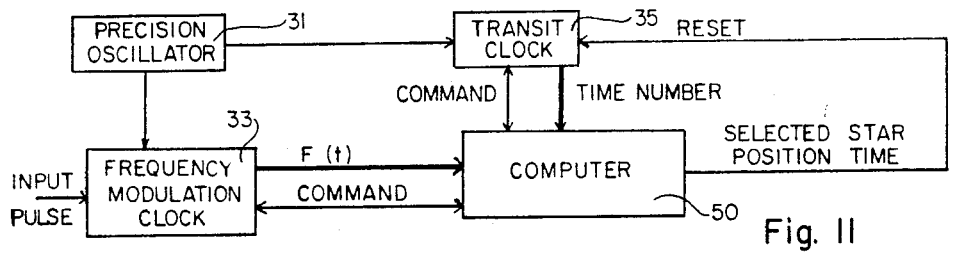
FIG. 11 is a block diagram of a coder for transposing the analog signals from the photosensitive means into digital signals for use in a digital computer.

The block diagram of FIG. 11 shows means by which information on star magniture and position are coded for computer use. Since all the available information from the photomultiplier requires time interval measurement, clock means must be provided. The block diagram shown in FIG. 11 shows how an input pulse derived from the variable-frequency pulse generator 109, FIG. 10, is converted into a digital output for computer use by the frequency modulation clock 33. Stated otherwise, the pulse generator rate is converted to star transit-time and magnitude for use by the computer. When properly zeroed, the transit clock 35 driven by precision oscillator 31 provides a real-time digital output. Frequency modulation clock 33 uses the precision output in order to convert input pulse-spacing to a digital number proportionate to star magnitude. Digital computer 50 provides the proper averaging of real-time indications and magnitude numbers obtained during a star transit.

Figure 12:
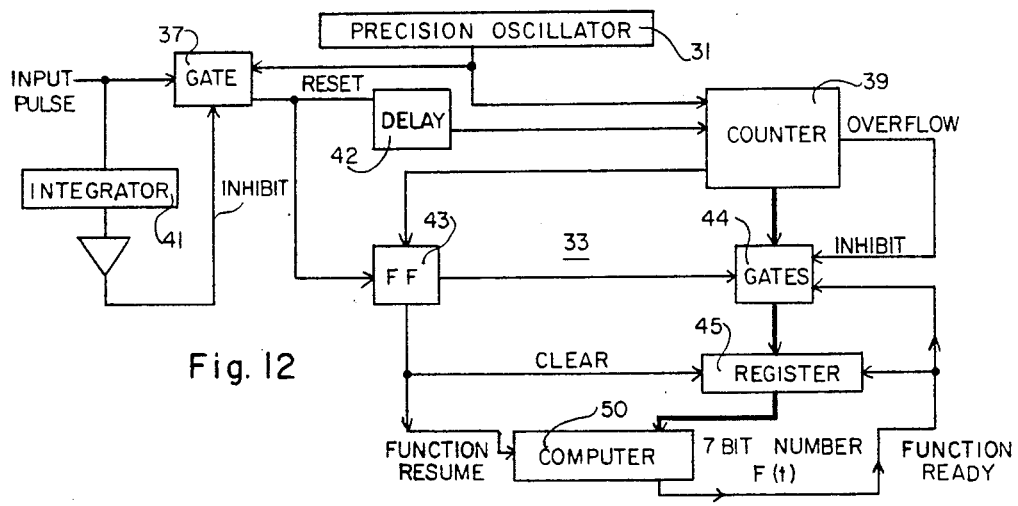
FIG. 12 is a block diagram showing in greater detail coder means for transposing analog signals from the photosensitive means and representing intensities of scanned celestial bodies into digital signals for use in the digital computer.

Operation of the system may be described by following the measurements of the star magnetiude function F(t) by the FM clock 33 in FIG. 12. An input pulse from the pulse generator 109 arrives at gate 37 which allows passage of a pulse from the precision oscillator 31 to travel through a delay 42 and reset a counter 39 to zero count. This counter then tallies pulses from the precision oscillator 31 until the arrival of the next input pulse from the pulse generator 109. At this time a pulse from gate 37 operates a flip-flop 43 and enables the gate 44 to permits the counter 39 to transfer its count tally to the register 45. This same pulse traversing the delay 42 resets the counter 39 to zero. On resetting to zero, the counter resets the flip-flop 43 and blocks the gate 44.

The count transferred to the register 45 is a measure of the time interval between successive pulses from the pulse generator 109. On activation of the function-ready line by the computer the latter takes the number from register 45, if a function-resume signal is activated by flip-flop 43.

Arrival of the next pulse from the pulse generator 109 will likewise cause the number of pulses from the oscillator 31 accumulated by the counter 39 to be gated into the register 45 and subsequently into the computer 50. Each time, the counter 39 is reset to zero in preparation for the next accumulation.

The precision oscillator 31 is required to have sufficient accuracy to introduce a negligible error into the time measurement. To be on the safe side, this clock should have an error which is about 1/10 that required from the system as a whole, or $$\frac{\text{Precision of time measurements}}{\text{Lapsed time between measurements}} = \frac{50 \ \mu\text{sec.}}{50 \ \text{sec.}} = 10^{-6}$$

An oscillator stability of at least $1:10^6$ for one minute will therefore be required. A good crystal oscillator without an oven will maintain such stability for one-half hour so that comparisons of many transits can be made by the computer and still maintain required precision of measurement.

When the frequency F(t) is high enough to indicate a star of acceptable brightness, time numbers from the transit clock 35 which have been temporarily stored and which will remain until the completion of transit, will accompany the frequency number to permit the transit time to be calculated by the computer 50 and the temporary memory register 45 cleared for the next transit.

The mid-frequency represented by F(t) during a target transit, as calculated by the computer 50, will represent the target magnitude. If the target magnitude, while seeking to scan only stars, exceeds a certain upper threshold value, indicating the presence of a planet rather than a star, an analog integrator 41 will inhibit the gate 37 and reduce the frequency of the input pulses to zero, thereby inhibiting any attempt to measure the transit time or magnitude of that body. The computer program will await receipt of a certain minimum number of measurements of F(t) over a certain time period before making a transit calculation. This will effectively filter most of the "noise" from very intense sources, from partial transits and from star cluster responses.

Figure 13:
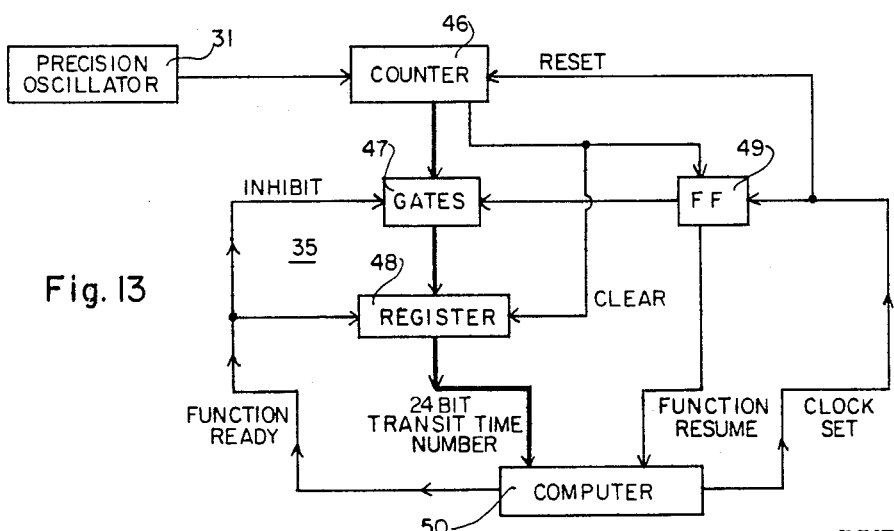
FIG. 13 is a block diagram showing in greater detail coder means for transposing analog signals from the photosensitive means and representing angular separations of scanned celestial bodies into digital signals for use in the digital computer.

A circuit arrangement is shown for the transit time clock in FIG. 13. A 24-bit time number is read from the transit time clock 35, FIG. 11, with values of F(t) so that the computer 50 can calculate the particular number to be designated as the transit time. This may be accomplished by the computer selecting, FIG. 13, an index star of sufficient magnitude and isolation to give an unambiguous signal. On detection of this star, a counter 46 is set to zero-count by the clock-set signal. The precision oscillator 31 delivers pulses which are then counted by the counter 46 until this index star is again recognized by the computer and another clock-set signal occurs. Thus, the counter generates a linearly increasing number proportional to the time of rotation between transits of the index star.

The counter 46 may be interrogated to deliver its instantaneous count at any time when the computer 50 supplies a function-ready signal to the gates 47, which couple the instantaneous count into the register 48 for extraction by the computer. When the count has been delivered to the register 48 a function-resume signal is sent to the computer to indicate that the number is ready. The function-ready signal will be synchronized with a star transit so that the exact transit time relative to the index can be determined. Calculation of separations between the transit time of one star compared with others in the field of view indicates the separation angles and assists identification of the stars by the computer.

Actually, very little memory would be required to perform the necessary transit time and magnitude calculations. Differencing of $F(t)$ numbers should require writing no more than 100 of the 7-bit numbers specifying star magnitude together with 100 matching 24-bit numbers specifying star positions for a total of 3100 bits. This much memory would be cleared after each calculation and could be used for the next. Use of an ordinary general purpose type computer is therefore very efficient.

FALSE TARGET DISCRIMINATION

With any measuring device, there will be some instances when false inputs will appear among legitimate measured quantities. The sensor described herein is not exempt from this, so means must be provided to correct for this defect. Fortunately, the phototubes and their associated electronics have properties which can be used to advantage.

First it is well to define the types of sources to be measured. There are only two:

(1) Stars of magnitude $\leq 2$, and
(2) Planets within the orbit of Saturn.

The stars are needed to establish the attitude of the vehicle as described above, while the planets allow us to determine position within the solar system in the ecliptic plane. Beginning with no previous knowledge of attitude or position, it is desirable that only the stars be considered until an attitude determination has been made, and that subsequently the plants be considered to find position. Thus, methods are needed which distinguish between stars and planets, for example, on the basis of light intensity.

But there are other optical sources in the sky such as the Sun, stars of magnitude greater than 2, planets outside the orbit of Jupiter, and asteroids, comets, and other satellites.

The first, the Sun, is quite a serious problem which will have to be coped with by the abovementioned shutter and solar cell sensor. The other types of false targets including radiation from the planets and bright stars can all be handled by using the correct combination of upper and lower bias levels forming thresholds of sensitivity to limit the output of the photomultiplier. Other discrimination techniques include pulse length determination, and rate of pulse rise and fall. For example, a star represents an almost perfect point source, however the edge of a nearby planet illuminated by the sun represents a target of extended luminosity. For a large target the rate of signal build-up or decay will be much slower than for a star, or for that matter than for a very distant planet.

The lower threshold level on the phototubes, provided by the resistance $R_o$ of transistor 108, FIG. 10, eliminates such things as phototube dark current, dim stars, and other lower luminosity objects. The upper bias level, serves as a means to assist the logical operation of the main computer 50, and this upper threshold discriminates against high luminosity objects such as bright planets, or nearby asteroids, comets, and artificial probes. The pulse length determination is also accomplished in the computer and serves to eliminate large planets, objects moving too slowly compared with the majority, and those moving too swiftly. Since the stars all subtend about the same angle, there should be little deviation in the pulse lengths from one star to the next. Finally, the rate of pulse rise and fall can be used to identify which side of a planet is appearing first. To explain this, the illuminated portions of the planets will, in general, have a crescent-moon shape in the usual case when they are not being viewed from the direction of the sun. Thus, as the slit scans the planet, the rise time of the pulse will depend upon whether the terminator, or the illuminated limb edge is sighted first. The current rises sharply, but decays more slowly when the limb edge is sighted first, and vice versa when the terminator edge is sighted first. This fact can be used to eliminate targets which have rise time characteristics differing from those of the other planets observed.

After applying the techniques mentioned above, the final test will be the consistency check using the three brightest targets within the threshold limits. The probability of two angular separations and corresponding intensity pairs being identical within measurement accuracy is extremely remote. Thus, the worst that can happen by way of mistakenly identifying a false target as a true one, is to extend the computer search after a failure of the three-target consistency check.

DIGITAL DATA PROCESSING

The signal processing equipment coupling the photomultiplier output to the digital computer has been described above, and it now remains to discuss the information flow from the signal processing equipment on through the computer 50 and to the output display. We will only consider here two tasks (both of which are, however, essential to the working of the system in all its applications): stellar target identification and attitude computation. Other possible outputs such as vehicle location or orbit determination are explained separately below.

For purposes of explaining the following identification sequence, it is important to note that two assumptions have been made: namely, that only measurements made on stars are being used (a somewhat different though essentially similar procedure is used for planet or satellite measurements), and that the scan is simple (i.e., no precession is taking place nor is there any misalignment of the instrument). Precessing and misalignment cause increasing difficulty and eventual impossibility of identifying the stars. This arises because of the desirability of using relatively simple mathematical calculation at this first step. When proceeding to the attitude determination step, however, precession and misalignment will be considered because they are not insurmountable but serve only to complicate the mathematics.

The most general motion under which the present system will operate on a practical basis is one in which the instrument is driven relative to a parent space vehicle, while at the same time the vehicle is itself in motion both translatory and rotary. Translation is of little interest here since during the time over which measurements are made, the location of the vehicle relative to the solar system bodies changes negligibly (except during orbit of a planetary body which is discussed separately below). The very general case mentioned above will not be discussed in great detail, therefore, but instead subsequent portions of the specification will consider cases in which either the vehicle or the instrument and the vehicle together are in motion. Thus, two cases arise: one, in which the space vehicle is stationary, or at least rotating sufficiently slowly so that its motion may be ignored, and the instrument is driven relative to the vehicle to effect scanning of the celestial sphere; the other, in which the instrument and vehicle are rigidly connected and rotate together in a scanning motion.

STAR IDENTIFICATION

Figure 14:
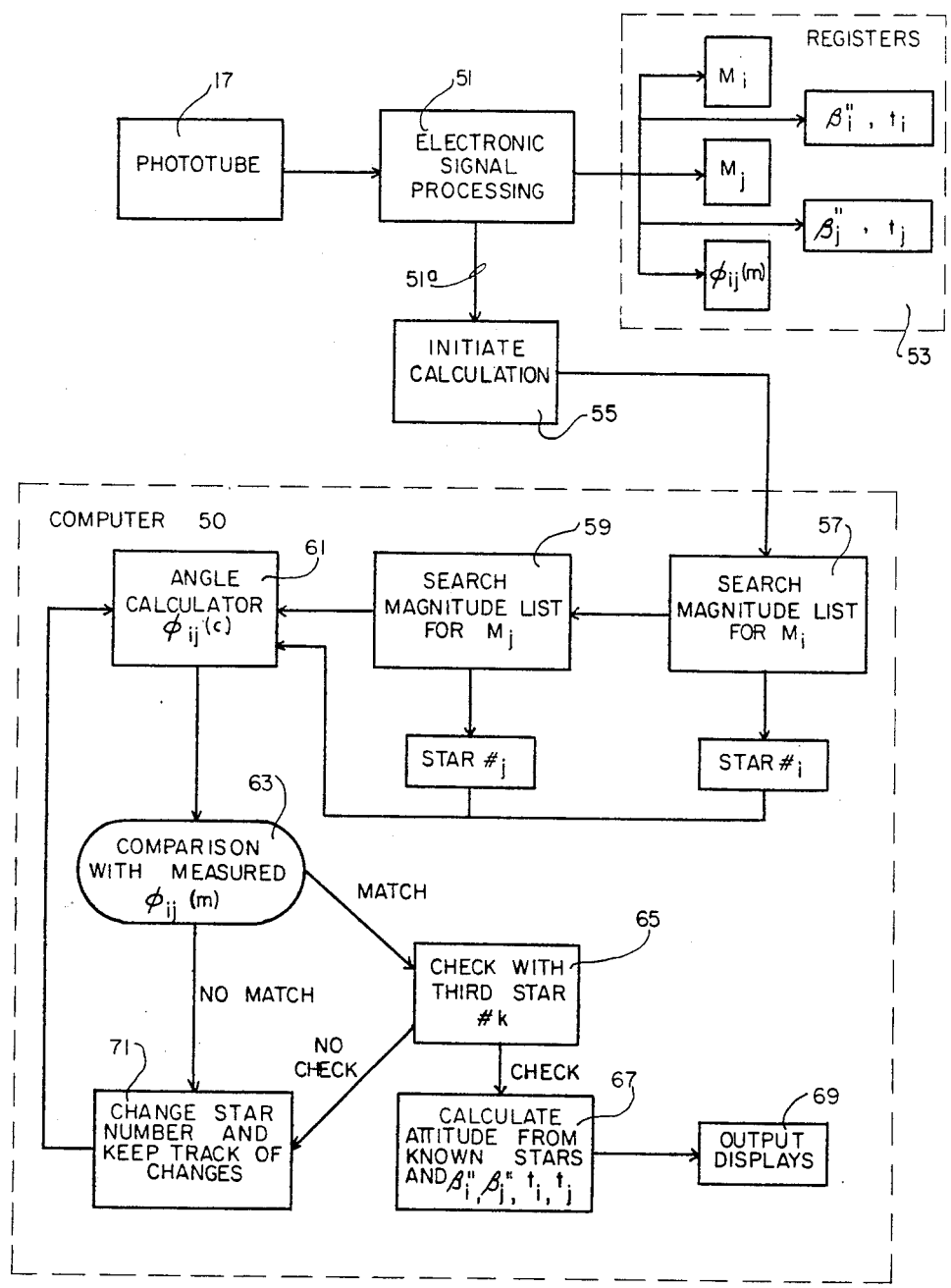
FIG. 14 is a block diagram, showing the photosensitive tube coupled with means for comparing measured data representing intensities and separations with previously stored data contained in computer matrices in order to identify the scanned bodies.

FIG. 14 shows a system for the identification of two stars, with a third star used as a check to avoid possible ambiguities. The output of the electronic signal processing circuits 51, which were discussed in connection with FIGS. 10, 11, 12, and 13, are stored in addressable registers 53, including the elevation angle $\beta''$, the magnitudes M and transit times $t$ of each star. The output along lead 51a will also actuate the computer calculation initiator 55 which proceeds as follows: Two of the scanned stars are selected, usually the two brightest since these presumably have more precise measurements, and their measured angular separation $\phi_{ij}(m)$ is computed according to the equation (subscripts $i$ and $j$ refer to the selected $i$th and $j$th stars):

$$\phi_{ij}(m) = \cos^{-1}\left[\sin\beta_i'' \sin\beta_j'' + \cos\beta_i'' \cos\beta_j \cos\left(\frac{t_j - t_i}{T}\right)\right]$$

where T is the scan period, assumed above to be simple rotation. The star catalog is stored in the computer 50 according to magnitude. Search means 57 and 59 are then activated to find, solely on the basis of the measured magnitude, first approximations providing tentative identification of the two stars. When they have been tentatively identified, their true angular separation $\phi_{ij}(c)$ is computed by a calculator 61:

$$\phi_{ij}(c) = \cos^{-1}[\sin\delta_i \sin\delta_j + \cos\delta_i \cos\delta_j \cos(\alpha_j - \alpha_i)]$$

where the $\alpha$'s and $\delta$'s are the right ascensions and declinations, respectively, of the two stars. The computed and measured separation angles are compared by comparison means 63. If they match, the process is repeated for a third star, using circuit 65, and then the attitude of the vehicle is computed by the calculator 67 as described below and displayed at 69. This display is composed of three five- or six-digit numbers which indicate the angular orientation of the vehicle in space. If there is no match, one of the stars is discarded and a different star is picked from the magnitude list by a circuit 71 which new star has the closest magnitude to the one already reviewed, and the calculation is repeated by the calculator 61. Only one star is changed at a time, and this process is continued until a match is obtained, or a certain number of star pairs has been exceeded and the signals are all rejected. In this event another set of optical measurements must be initiated.

Once three stars have been identified by the above procedure, the remaining detected targets (stars, planets, satellites, etc.) can be identified by a greatly simplified sequence based on the fact that attitude is now known.

ATTITUDE DETERMINATION

Figure 15:
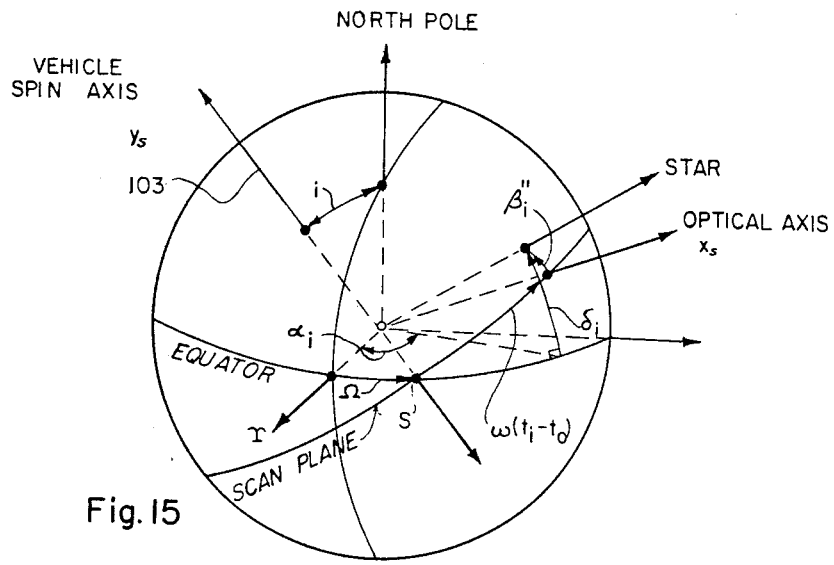
FIG. 15 is a diagram showing the relationship on the celestial sphere of the astronomical coordinate frame, a star, and the vehicle scan plane.

The determination of vehicle attitude as explained below involves the solution of a system of simultaneous non-linear equations in four or more unknowns depending on the complexity of the scanning motion. Let us first discuss, in relation to FIG. 15, the more simplified case involving constant-rate scanning in a plane normal to a fixed scan axis. FIG. 15 shows the relationship between the astronomical coordinate frame (made up of three mutually orthogonal axes, one extended towards $\Upsilon$ the First Point of Aries, another 90 degrees to the east along the equator, and the third extended towards the North Pole), and the vehicle spin coordinate frame (consisting of three axes, one lying along the optical axis $x_s$, another 90 degrees along the scan plane in the direction of scan, and the third lying along the vehicle spin axis $z_s$). Also shown in the position of the $i$th star, the intersection S of the scan and equatorial planes, and the position of the optical axis at time $t_i$ when the vehicle spin axis, optical axis, and direction to the star are coplanar. The direction cosines of the star relative to the vehicle spin coordinate system are given by $$\cos\beta_i'', \; 0, \; \sin\beta_i''$$

while with respect to the astronomical coordinate frame by $$\cos\delta_i \cos\alpha_i, \; \cos\delta_i \sin\alpha_i, \; \sin\delta_i$$

The equations relating these two sets of direction cosines involve coordinate transformations as indicated below in standard matrix notation:

$$\begin{pmatrix}\cos\delta_i\cos\alpha_i\\ \cos\delta_i\sin\alpha_i\\ \sin\delta_i\end{pmatrix} = \begin{pmatrix}\cos\Omega & -\cos i\sin\Omega & \sin i\sin\Omega\\ \sin\Omega & \cos i\sin\Omega & -\sin i\sin\Omega\\ 0 & \sin i & \cos i\end{pmatrix}\times$$

$$\begin{pmatrix}\cos\omega(t_i-t_o) & -\sin\omega(t_i-t_o) & 0\\ \sin\omega(t_i-t_o) & \cos\omega(t_i-t_o) & 0\\ 0 & 0 & 1\end{pmatrix}\times\begin{pmatrix}\cos\beta_i''\\ 0\\ \sin\beta_i''\end{pmatrix}$$

In these equations and in FIG. 15, $\Omega$ and $i$ describe the orientation of the scan plane with respect to the astronomical frame, $\omega$ is the angular scan rate:

$$w = 2\pi T$$

T is the spin period, and $t_o$ denotes the instant at which the optical axis passes through the equator in a northerly direction. One such set of equations is applicable for each detected star. Assuming it to be already identified, the only unknown quantities are $\Omega$, $i$, $t_o$, T. (The period T may have already been determined by completing the scan rotation. The example under present discussion is thus slightly more general.) The matrix equation above yields three ordinary equations only two of which are independent. The measurement and identification of two stars, therefore, yields four independent equations which can be solved for the four unknowns (provided that the solution exists) by standard methods.

Having disposed of the simplest case let us now describe the more difficult procedure used to compute the attitude when precession and instrument misalignment are present. (Any number of misalignments are possible.) FIGS. 16, 17, 18, 19, and 20 are applicable. The previously described method of computing the elevation angles $\beta''$ is no longer valid because of the complicated scanning motion. Rather we must deal with the individual slit transits shown in FIG. 16, which illustrates how the $i$th star moves through the field of view of the optical system, transiting slit 3 at an angle $\tau_{3i}$ along the slit from the optical axis, and slit 2 at a similar angle $\tau_{2i}$. The view is along the optical axis showing the slits inclined by an angle $\Gamma$ relative to the instrument axis.

FIGURE 17 shows the effect of misalignment of the instrument coordinate frame (composed of the optical axis $x_i$, the instrument axis, and an axis completing the right-hand system) relative to the vehicle spin coordinate frame (vehicle spin axis $\omega$, the axis to $S'$, and an axis completing the right-hand system). The angles of misalignment are $\eta$ and $\psi$. (When $\eta=0$, $\psi$ is indeterminant.) FIG. 18 shows the relation of the vehicle spin frame to the vehicle precession frame, and FIG. 19 shows the relation of this latter to the astronomic frame.

Figure 16:
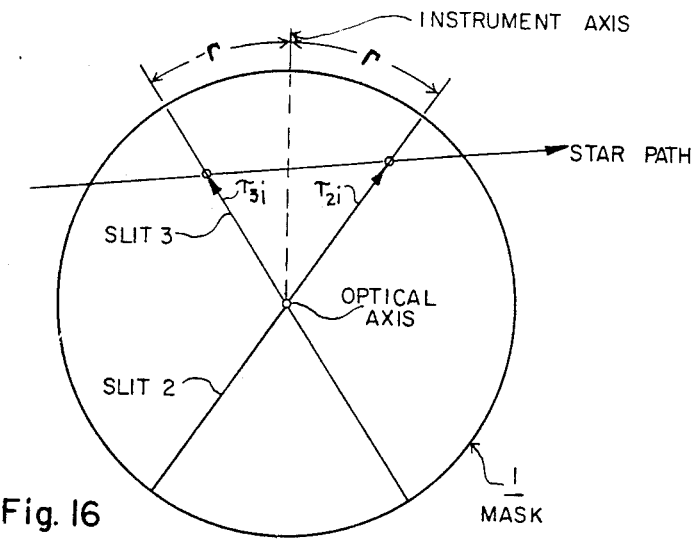
FIG. 16 is a diagram similar to FIG. 4, but showing the passage of a star past two crossed slits where, due to precession and/or misalignment, the image intercepts the two slits at different distances from the optical axis where the two slits cross.

The direction cosines of the $i$th start relative to the instrument frame are found from FIG. 16:

$$\begin{pmatrix}\cos\tau_{3i}\\ -\sin\tau_{3i}\sin\Gamma\\ \sin\tau_{3i}\cos\Gamma\end{pmatrix}$$

where $2\Gamma$ is the angle between the slits, and $\tau_{3i}$ is the angle along slit number 3 measured from the optical axis and considered positive in the direction of the instrument axis. A similar set of direction cosines exist for the second slit with $\tau_{3i}$ replaced by $\tau_{2i}$ and $-\Gamma$ by $\Gamma$. To relate these as before to the stellar direction cosines in the astronomical frame requires several coordinate transformations through the intermediate frames. The final matrix equation is:

$$\begin{pmatrix} \cos\delta_i\cos\alpha_i \\ \cos\delta_i\sin\alpha_i \\ \sin\delta_i \end{pmatrix} = \begin{pmatrix} \cos\Omega & -\cos\gamma\sin\Omega & \sin\gamma\sin\Omega \\ \sin\Omega & \cos\gamma\cos\Omega & -\sin\gamma\cos\Omega \\ 0 & \sin\gamma & \cos\gamma \end{pmatrix} \times$$

$$\begin{pmatrix} \cos H_3 & -\cos i\sin H^3 & \sin i\sin H_3 \\ \sin H_3 & \cos i\sin H_3 & -\sin i\cos H^3 \\ 0 & \sin i & \cos i \end{pmatrix} \times$$

$$\begin{pmatrix} \cos\omega(t_{3i}-t_o) & -\sin\omega(t_{3i}-t_o) & 0 \\ \sin\omega(t_{3i}-t_o) & \cos\omega(t_{3i}-t_o) & 0 \\ 0 & 0 & 1 \end{pmatrix} \times$$

$$\begin{pmatrix} \cos\psi & -\sin\psi & 0 \\ \sin\psi\cos\eta & \cos\psi\cos\eta & -\sin\eta \\ \sin\psi\sin\eta & \cos\psi\sin\eta & \cos\eta \end{pmatrix} \begin{pmatrix} \cos\tau_{3i} \\ -\sin\tau_{3i}\sin\Gamma \\ \sin\tau_{3i}\cos\Gamma \end{pmatrix}$$

where $$H_3 = \Omega'(t_{3i} - t_o')$$

$t_{3i}$ is the time of transit of the $i$th star across slit number 3, $t_o'$ is the instant that axis S crosses the equator in a northerly direction, and $t_o$ is the instant that axis S' crosses the plane normal to the vehicle precession axis in a direction which carries it into the hemisphere containing both the scan and precession axes. The angles $\gamma$ and $\Omega$ describe the orientation of the precsssion axis relative to the north pole and equator.

The two quantities $\omega$ and $\Omega'$ are, respectively, the scan and precession angular rates and are related via the dynamics of the motion. Any rigid body has three principal moments of inertia along three mutually orthogonal coordinate axes having as their origin the center of mass of the body. The force-free motion of this body is governed by these principal moments of inertia. If all three are equal, the body, if it spins, will not precess, i.e. the spin axis remains fixed in inertial space. If only two moments are equal, the spinning body will precess, the spin axis following a cone with apex at the center of mass and having as its axis the precession axis. The angular rate of precession, $\Omega'$, is, in this case, proportional to the angular spin rate, $\omega$, according to:

$$\frac{\Omega'}{\omega} = \frac{I_3 - I_1}{I_1}$$

where $I_3$ and $I_1$ are two unequal moments of inertia, and $I_2 = I_1$. It can be seen from this relation, that the closer $I_3$ gets to $I_1$, the smaller $\Omega'$ is in comparison to $\omega$. The case involving three unequal moments will not be discussed since this creates a motion of such complexity that resolving it is difficult. Precessional motion of any magnitude likely to cause trouble will probably occur only when the space vehicle has been left to drift for long periods of time before any correctional forces are applied. Furthermore, in an unmanned probe, the body could be fabricated in such a way that all three moments were practically equal, thus eliminating any precession problems. If precession occurs, however, and if the motion is severe enough to preclude the measurements of star angle positions, a corrective maneuver will have to first be performed by the vehicle before an attitude determination can be made.

Returning now to the above matrix equation, we see that it contains eight unknown parameters of motion: $\Omega$, $\gamma$, $t_o'$, $t_o$, $i$, $\omega$, $\eta$, and $\psi$. ($\alpha_i$ and $\delta_i$ are known since the star is assumed identified, while $\Gamma$ is known as an instrument design parameter.) An additional unknown $\tau_{3i}$ is present for each star transit of a given slit. Again, of the three equations implied by the single matrix equation, only two are independent. We can combine these to eliminate the unwanted unknown $\tau_{3i}$. Thus for each transit of each star across each slit, a single equation is generated containing the above eight unknown parameters of motion. Eight such transits (or four stars since two slits are present) yields then a sufficient set of equations to permit a solution provided that one exists. Having obtained the solution, that is, having computed specific values for all eight of the above parameters, they can be employed in suitable equations to permit the explicit computation of attitude for any given time.

If there is not precession, $\Omega' = 0$ and $i$ and $\gamma$ will combine to form one unknown angle. Thus the unknowns in this case are six, and only three stars are needed. Furthermore, if the spin axis direction were known in relation to the space vehicle (i.e., $\eta$ and $\psi$ were known), only two stars would be needed. These latter two cases point up an ambiguity concerning the "sense" or polarity of the vehicle rotation. It is removed if either the spin direction is known with respect to the vehicle, or three stars (non-coplanar) are used.

A suitable computer 50 to be used in the present system would be one having a capability similar to the Control Data Corporation model 160 computer. This is a general purpose digital computer operating from a stored program in parallel mode using 12-bit words. There are 4096 words in the memory which has a storage cycle time of 6.4 microseconds. The printed-circuit modules operate with a 5 megacycle phase rate. This computer can be easily programmed using standard procedures of programming to perform the functions called for in the diagram of FIG. 14.

OPERATIONS USING PLANETARY AND OTHER DATA

It will be assumed in what follows that the process of finding the attitude of the vehicle is understood and has in fact been done. There are other determinations which can, however, be accomplished utilizing solar system bodies. In order to make clearer the workings of the present system in this respect, several examples will be discussed. These are not the only modes of operation in addition to that of determining attitude, but are merely brought forth to indicate the system's functions and advantages, and its versatility.

The uses discussed herein are divided into three parts: (1) interplanetary mid-course position sensing; (2) planetary satellite orbit determinations; and (3) surface navigation. In all of these examples, the instrument must complete a portion of a revolution sufficient to scan a segment of the sky containing at least two (three to resolve possible ambiguities) stars and one or more solar system bodies depending upon what final determinations are required. The star selection problem and attitude determinations are in these examples the same as has been already discussed.

INTERPLANETARY POSITION SENSING

A somewhat similar procedure to that of determining attitude is employed to find the vehicle's location within the solar system by triangulation on the planets. The present discussion is mainly concerned with the steps necessary to solve this problem and the number of measurements necessary to guarantee a unique solution.

When a space vehicle is sent on its journey to some planet or moon from some other such body, a definite predetermined path should be followed. The accuracy to which this is done will need to increase as the vehicle draws closer to its destination. In order to stay near this path, a method of position determination is necessary. Also, in many instances, it will be advantageous to know the attitude of this vehicle in order that other operations such as mid-course guidance, telemetry, etc., may be carried out.

The whole navigation problem is divided into two parts: one concerned with the determination of the attitude of a spinning vehicle whose moments of inertia are not all matched so that the spin axis precesses, and the other concerned with the calculation of location within the solar system. The first is by far mathematically the most difficult and has been described above. The second imposes the requirement that the scan axis be nearly normal to the ecliptic plane E, FIGS. 1 and 2. If it were otherwise, the probability of picking up usable planets in the field of view would be very small, and if at least two cannot be found, location cannot be determined without recourse to the sun, which recourse is to be avoided because of its extreme brightness and likelihood of damage to the photosensitive sensor.

Assuming that a sufficient number of stars have been identified with their positions measured with respect to the vehicle's coordinate system to enable attitude determination to be made, we now describe the method to be used in determining the location of the vehicle in the solar system with respect to the ecliptic coordinate frame. The relationship of the astronomical frame of reference in which the positions of stars are usually given to the ecliptic frame in which the locations of planets are usually given is as shown in FIG. 20. Any direction given by right ascension $\alpha$ and declination $\delta$ in the astronomical frame is given by longitude $\lambda$ and latitude $\beta$ in the eliptic frame, where $$\beta = \sin^{-1}(\cos \epsilon \sin \delta - \sin \epsilon \cos \delta \sin \alpha)$$

$$\lambda = \cos^{-1}\left(\frac{\cos \delta \cos \alpha}{\cos \beta}\right)$$

and $\epsilon$ is the obliquity of the ecliptic.

From now on referring everything to the ecliptic frame, if an ephemeris of the planets is kept stored in the computer 50 memory, a measurement by the scanner of the direction of several planets from the space vehicle relative to the celestial sphere can be used to ascertain the location of this vehicle in the solar system. Let us say that two identified planets have been so measured and the geometry is like that in FIG. 21. The directions of the vectors $\bar{\rho}_1$ and $\bar{\rho}_2$ are measured by the sensor while $P_1$, $\Theta_1$, $\Phi_1$, $P_2$, $\Theta_2$, $\Phi_2$ are stored in the computer or computed from an ephemeris. P is the distance of the planet from the sun, $\Theta$ the ecliptic longitude, and $\Phi$ the elevation of the planet above the ecliptic plane. Designating the position vector of the planet relative to the space vehicle by $\bar{P}$, then:

$$\bar{P}_3 = \bar{P}_2 - \rho_2$$
$$\bar{P}_2 = \bar{P}_1 - \rho_1$$

where subscripts 1 and 2 denote the two measured planets and subscript 3 denotes the space vehicle.

These two vector equations represent six ordinary equations for the solution of the five unknowns: $\rho_1$, $\rho_2$, $P_3$, $\Theta_3$, $\Phi_3$. These give the distances to the two planets in question plus the position vector of the vehicle relative to the sun. From this, the distance to any other solar system body may be computed if needed.

Another application of the present invention involves determining both the attitude and location of the vehicle by measurements made on solar system bodies only. This involves, as it does with stars, the scanning of at least three solar system bodies, their identification using magnitudes and angular separations, and the subsequent solution of the appropriate equations to compute attitude and location relative to these bodies. The identification procedure in this example requires that an approximate knowledge of the vehicle's location be available to the computer 50. This approximate location is used in conjunction with a planetary ephemeris to compute the expected angular separations among pairs of solar system bodies. The differences between the computed and measured angular separations are used to adjust the assumed vehicle location. This process is repeated until the computed and measured separations are equal within acceptable limits. It can be seen that the identification sequence by its very nature results in a location determination for the vehicle.

The present system can be used to determine the position of the vehicle relative to several planets, as shown above, and the same method can be applied to an Earth-Moon mission as illustrated in FIGS. 22 and 23. Attitude is determined as before by the stars or by the bodies along the ecliptic, and position is determined by sighting on both the earth and the moon for mid-course guidance. Of course, as the terminal phases are reached, this application of the device does not give a precise position determination because of the proximity of the bodies and also because the relative angle between the earth and moon is close to 0° or 180° as shown in FIG. 23.

During an around-the-moon lunar mission, the trajectory projected onto the ecliptic plane may look like that in FIG. 22. The angular separation between the earth and the moon during such lunar circumnavigation is shown in FIG. 23. The cross-hatched areas denote regions in which relatively large errors will be made because the angular separation is near 0° or 180°. When this happens, the estimate of range is difficult if the original concept of the technique is employed.

When the moon or the earth moves across the optical slit, it will not require a very large area of intersection to bring the phototube output current to that comparable with a bright star. For example, if the range is 300,000 kilometers, the slit need only see 0.6 second of arc of the moon to produce a signal similar to a star of magnitude 0.0. This corresponds to seeing a section of the moon about 0.9 kilometer wide and 110 kilometers long.

ORBIT DETERMINATION

In accordance with another use of the present system when the vehicle is close to the moon, to the earth, or to some other planet, the present invention can be used for navigation in two ways other than triangulation. These methods are illustrated in FIGS. 24, 25 and 26, and will now be explained.

The method shown in FIGS. 24 and 25 involves the same operating mode as is used for determining attitude using two slits 2 and 3 on the mask 1 except that a third slit 4 is used to enable one to calculate the apparent angular diameter of the planet. That is, the device scans the sky and determines, from star transits across the slits, the attitude of the vehicle as a function of time. If the orientation is proper, the scanned region will also contain a nearby planet or other solar system body as illustrated in FIG. 24. This being the case, a third slit 4 oriented between the other two as shown in FIG. 25, can be used to compute the angular diameter of the planet. A knowledge of its linear diameter then suffices to compute the vehicle's distance from the said planet. This is called stadimetric ranging and is very similar to its terrestrial counterpart except in the method of determining angular diameter, which is that of scanning the object with a series of slits and timing the instant of slit contacts with the object. The equations by means of which the angular diameter is computed are, for a spherical planet and uniform scan rate:

$$\cos \nu = \left[\frac{\sin^2 R \tan^2 \mu + \sin^2 \Gamma}{\sin^2 \mu \cos^2 \Gamma + \sin^2 \Gamma}\right]^{1/2}$$

$$\sin\left[\xi - \frac{\omega}{2}(t_3 + t^2 - 2t_o)\right] = \pm \frac{\sin R}{\cos \Gamma \cos \nu \cos \mu} \pm$$

$$\sin R = \cos \nu \sin [\xi - \omega(t_3 - t_o)]$$

where $R$ = angular radius of the planet,
$\xi$, $\nu$ = angular coordinates giving direction to the planet center relative to star-determined zero azimuth and optical axis scan plane, $\omega$=camera angular spin rate,
$t_0$=time of zero azimuth determined from stars,
$t_2$, $t_3$, $t_4$=times of entry or exit of planet from slits as indicated in FIG. 25,
$2\Gamma$=angle between slits as shown in FIG. 25, and $$\mu=\frac{\omega(t_3-t_2)}{2}$$

The solution of these equations will give the position of the planet center relative to the vehicle once attitude has been determined from stars or other planets. Geometrically, this corresponds in the two-dimensional world to determining the center and radius of a circle, given the locations of three points on its periphery.

In addition to the distance from the planet, the direction to the planet can be found since star transits have already determined the vehicle attitude. Thus, the transit of a nearby planet across a slit system such as shown in FIG. 25 will permit computation of the vehicle location relative to that planet and to the celestial sphere.

This method cannot be used at altitudes less than 1.44 planetary radii as is shown below. At altitudes greater than about ten planetary radii the three-slit geometry introduces errors which are greater than those resulting from two-body triangulation. Hence, the additional slit 4 is useful over a limited range of altitudes or when the space vehicle comes within a certain minimum distance of the planet, because the apparent image of the planet no longer can be made geometrically tangent to the two crossed slits. The minimum usable altitude increases relatively rapidly with decrease in the field of view of the camera or increase in the angle between the slits. Probably the lowest altitude one can hope to achieve with a high quality optical system (FOV=50°; slit angle=30°) is about 18% of the body radius. For the earth this implies a minimum altitude of 700 miles, and for the monn 200 miles.

Though this method is primarily concerned with the determination of vehicle location, it can also be used for determination of the orbit of a satellite vehicle in the altitude region specified above. This latter application arises from the fact, well known in the discipline of celestial mechanics, that two location specifications are sufficient to determine the orbit of a satellite.

Another method of determining the path of an orbiting vehicle by use of the described sensor is shown in FIG. 26 and involves essentially a different operating mode than does the triangulation technique or the direction-altitude technique, and the minimum altitude considerations do not apply to this method. Assume that a local vertical-sensor $Sk$ such as an infrared horizon scanner is provided to keep that portion of the space vehicle directly opposite to the optical axis always pointed towards a planet's center, and the scanning means 104 pointed radially outward. This is a natural operating mode when the space vehicle orbits about any celestial body and is frequently used on earth satellites. Since the optical system 104 faces diametrically opposite to the horizon scanner $Sk$, it executes a scan of the celestial sphere by virtue of the orbiting motion of the vehicle about the planet. By measuring the time of appearance of a minimum of three stars, the plane of the scan can be determined which coincides with the plane of the orbit. Furthermore, the semi-major axis $a$ of the orbit is dynamically related to the orbital or scan period T by $$T^2=4\pi^2\frac{a^3}{MG}$$

where M is the mass of the central body and G is the universal gravitational constant. Three further quantities: the argument of perigee, the eccentricity of the ellipse, and the time that the satellite passes through perigee, which complete the determination of the orbit, can also be computed from the star transit times, though only by use of equations of greater complexity. From the six orbital elements thus determined, the position of the space vehicle as a function of time can be calculated. This technique will work at any altitude where the vehicle orbit will maintain a reasonable amount of stability and at which the horizon scanner $Sk$ will return a continuous planetocentric orientation.

POLYANGULATION

When using the described instrument to determine vehicle location relative to two solar system bodies as discussed above, it will often happen that three or more such bodies will be scanned during one vehicle rotation. In order to take full advantage of all such observational data on solar-system bodies, a statistical technique has been developed which is based on least squares polyangulation. As above, in the case of two-body vehicle location determination, assume that the vehicle rotates so that the scanner 104 scans about the celestial sphere. Assuming orientation of the scan axis approximately normal to the ecliptic plane, each solar-system body scanned will permit its observed direction relative to the background of stars to be computed. The present location of the body together with this direction then defines a line in space upon which the vehicle must lie. For each solar-system body, therefore, one such line is computed, the vehicle being located at their juncture. Because of the inevitable presence of measurement errors, these lines will not exactly cross. The polyangulation technique described below is a method by which the "best" (in some sense to be defined below) location can be statistically determined. To recapitulate, this technique regards each body as defining a line in space whose positional uncertainty may be considered to be proportional to the product of the length of the line and the estimated R.M.S. angular error in the measurement of the direction to the body, FIG. 28. In this case the weighted least square location of the space vehicle is determined without even performing a simple two-planet triangulation. The polyangulation technique automatically weights most heavily those sight lines which carry the least positional uncertainty. Thus, as a space vehicle travels from Earth to Mars it might happen that the position fix is dominated by data from the earth and the moon early in the flight; at mid-course the earth and Mars sight lines might have the heaviest weight; at the terminal phase, Mars and its moons, Phobos and Deimos, will dominate the position of calculation.

The navigational technique which involves the use of two-planet triangulation forms the starting point for the present analysis. However, the nature of the observing instrument is such that it scans the entire ecliptic, and this means that more than two solar-system targets will be available for triangulation. Rather than perform a series of separate triangulations and then attempt to combine their results or to search for the best single triangulation, it was felt that a method was needed which statistically determined the position of the space vehicle.

The method which is derived below is similar to the well-known Sumner Navigational Method which measures the zenith distance of several stars—each zenith distance providing a circle of position, the intersection of two circles defining a point. The polyangulation method differs from the Sumner Method in that each solar-system body defines a true "line of position" rather than a circle of position; in that the uncertainties associated with each solar-system line near the region of confluence differ grossly, while the errors of the various Earth referenced zenith angle measurements are not greatly different; in that the interplanetary navigation problem is three-dimensional (Earth navigation is two-dimensional); in that the relative positions of the various solar-system bodies are continuously changing while the stars used in the Sumner Method require only minor positional corrections; and in that in the case of an Earth navigation problem, the direction of the local gravity vector forms the reference for the angle measurement, while in the space navigation problem a stellar-inertial attitude reference is used.

The space vehicle viewing geometry and the planetary position coordinates are shown in FIG. 27. A heliocentric coordinate system $(P,\Theta,\Phi)$ is used in which the x-y plane coincides with the ecliptic. In order to simplify the drawing, only one planet is shown. The fact that the sight line does not intersect the space vehicle represents the likelihood that an error will exist in the measurement of the direction of this sight line in inertial space. The normal line is defined as that line which passes through the space vehicle and which is orthogonal to the sight line. It is used to define the minimum deviation $d_i$ of the space vehicle from the sight line to the $i$th planet.

The equations needed for the polyangulation technique are shown in the following, which also includes definitions of some of the variables:

*Position of ith planet*

$$x_i = P_i \cos \Theta_i \cos \Phi_i \quad (2)$$
$$y_i = P_i \sin \Theta_i \cos \Phi_i \quad (3)$$
$$z_i = P_i \sin \Phi_i \quad (4)$$

*Sight line to ithe planet as seen from space vehicle*

$$y = m_i x + b_i \quad (5)$$
$$z = n_i x + c_i \quad (6)$$
$$m_i = \tan \theta_i \quad (7)$$

$$n_i = \frac{\tan \phi_i}{\cos \theta_i} \quad (8)$$

$$b_i = P_i \cos \Phi_i [\sin \theta_i - \cos \theta_i \tan \theta_i] \quad (9)$$

$$C_i = P_i \left[ \sin \Phi_i - \frac{\cos \Theta_i \cos \Phi_i \tan \phi_i}{\cos \theta_i} \right] \quad (10)$$

*Position of space vehicle*

$$X = P \cos \Theta \cos \Phi \quad (11)$$
$$Y = P \sin \Theta \cos \Phi \quad (12)$$
$$Z = P \sin \Phi \quad (13)$$

*Normal line from true position of space vehicle to sight line*

$$y = M_i x + B_i \quad (14)$$
$$z = N_i x + C_i \quad (15)$$

*Intersection of normal line with sight line*

$$x_o = \frac{m_i(Y - b_i) + n_i(Z - c_i) + X}{1 + m_i^2 + n_i^2} \quad (16)$$

$$y_o = m_i x_o + b_i \quad (17)$$
$$z_o = n_i x_o + c_i \quad (18)$$

*Shortest distance from space vehicle to ith planet sight line*

$$d_i^2 = [(x_o - X)^2 + (y_o - Y)^2 + (z_o - Z)^2] \quad (19)$$

*Weighted residual distances for k planets*

$$\mathfrak{R} = \sum_{i=1}^{k} w_i d_i^2 \quad (20)$$

*Least square equations*

$$\frac{\partial \mathfrak{R}}{\partial X} = \frac{\partial \mathfrak{R}}{\partial Y} = \frac{\partial \mathfrak{R}}{\partial Z} = 0 \quad (21, 22, 23)$$

*Example of weighting function for observations of ith planet*

$$w_i = \frac{1}{\rho_i^2 [\sigma_i^2(\phi) + \sigma_i^2(\theta)]^{1/2}} \quad (24)$$

FIG. 28 illustrates the effect of an angular error in the measurement of the position of a planet on the R.M.S. computed error in the position of the vehicle. Assuming the R.M.S. error in the measurement of the angular position of the $i$th planet relative to the stars is $\sigma_i(\Theta)$, then the resulting R.M.S. position error in the position of the space vehicle is $\rho_i \sigma_i(\Theta)$. $\rho_i$ is the distance from the planet to the vehicle. This figure illustrates that the effect of angular errors is greater for more distant planets, and therefore the weight $w_i(\Theta)$ which is assigned to a given measurement is smaller. Equations 2 through 4 give the position of the $i$th planet. The projection form of the equations of the sight line are given as Equations 5 and 6. The constants of these two equations are identified in Equations 7 through 10. These constants are established from the measured angular directions to the $i$th planet, $\Theta_i$ and $\phi_i$, and the known position of the planet in ecliptic coordinates $(P,\Theta,\Phi)$. Equations 11 through 13 define the coordinates of the space vehicle. Equations 14 and 15 establish the normal line. The parameters of the normal line need not be known. However, Equations 16 through 18 yield the point of orthogonal intersection of the normal line and the sight line.

It is now possible in Equation 19 to define the shortest distance of the space vehicle to the $i$th planet sight line in terms of known quantities. These are the measured angular direction of the planet as seen from the space vehicle, the known position of the $i$th planet, and an assumed but yet undefined position of the space vehicle. The calculated position of the space vehicle will be that position which minimizes the sum of the squares of the weighted residuals. Equations 21 through 23 provide three linear simultaneous equations in terms of X, Y, and Z.

Equation 24 shows what is probably the simplest form of the weighting function other than to assume it is a constant. In this case the weighting factor is proportional to the position uncertainty of the sight line at the estimated position of the space vehicle. $\rho_i$ is the distance to the $i$th planet and $$[\sigma_i^2(\Theta) + \sigma_i^2(\phi)]^{1/2}$$

is the R.M.S. error in the measured angular direction of the planet, FIG. 28. Other forms of the weighting function have been considered, but are not needed for the mid-course interplanetary navigation problems. For example, the position of the planetary sight line may contain a translational error as well as an angular error. This reflects the fact that errors are made in the determination of the position of the edge of the planet as well as in the direction of the planet. As is necessary for minimized variance, the weights of the individual lines are inversely proportional to the variance of the position uncertainty. Although the accuracy of the astronomical unit is likely to be improved considerably in the next few years it is not entirely valid to ignore the error in the absolute position of the various planets. This is particularly true for values of $\sigma_i(\Theta)$, $\sigma_i(\phi) \leq 10$ seconds of arc.

If the values of $x_o$, $y_o$, and $z_o$ in Equations 16 through 18 are substituted in Equation 19, the least square Equations 21 through 23 can be evaluated. When this is done the following matrix equations are obtained where the summation is, in each case, over the $k$ planetary bodies detected. A solution of these equations for the space vehicle position, X, Y, and Z, yields the desired result.

*Least square polyangulation equations*

$$\begin{bmatrix} +\sum_{i=1}^{k} w_i h_i (m_i b_i + n_i c_i) \\ +\sum w_i [b_i - h_i m_i (m_i b_i + n_i c_i)] \\ +\sum w_i [c_i - h_i n_i (m_i b_i + n_i c_i)] \end{bmatrix} =$$

$$\begin{bmatrix} +\sum_{i=1}^{k} w_i (h_i - 1), & +\sum w_i h_i m_i, & +\sum w_i h_i n_i \\ -\sum w_i h_i m_i, & +\sum w_i (1 - m_i^2 h_i), & -\sum w_i m_i n_i h_i \\ -\sum w_i h_i n_i, & -\sum w_i h_i m_i n_i, & +\sum w_i (1 - n_i^2 h_i) \end{bmatrix} \begin{bmatrix} X \\ Y \\ Z \end{bmatrix}$$

$$h_i = \frac{1}{1 + m_i^2 + n_i^2}$$

The fact that more statistical data is available in the form of redundant angular measurements of the planetary positions is not the main virtue of the least square polyangulation technique. The primary advantage lies in the fact that this method automatically weights the position determination in a manner which yields the least error sensitivity coefficients which can be obtained with a given set of data.

While a weighted least squares analysis may be performed with "planes, lines, or points of position," it is believed that the error pattern obtained with the instrument proposed in the present disclosure most logically leads to the use of a line of position. The errors in the angular position measurements of the stars will be smaller than for the planets, and therefore, the errors in establishing the orientation of the vehicle's coordinate frame can almost be disregarded as contributors to planetary angular position errors. In contrast, the use of surfaces of position, using one planet and one star, requires that two measurements which have errors of different sizes be combined. In addition, the nature of the observing instrument is such that certain of the systematic errors in the elevation angle measurement $\phi$ are cancelled, while both the random errors and the systematic errors in the azimuth angle are present. Consequently the weight functions for azimuth and elevation angular measurements (Equation 24) will differ and the computer will have to take account of this fact.

This invention is not to be limited to the illustrative embodiments and examples of the drawings for obviously various other embodiments and uses are possible within the limitations of the following claims.

GLOSSARY OF SYMBOLS $\alpha$ right ascension } standard symbols for location of objects on celestial sphere in astronomic coordinate frame
$\delta$ declination $\lambda$ longitude } standard symbols for location of objects on celestial sphere in ecliptic coordinate frame
$\beta$ latitude $\beta''$ elevation angle of target above scan plane
$\epsilon = 23°27'$ obliquity of the ecliptic
R angular radius of planet
$i,j,k$ subscripts
$i$ angle between planes (FIGS. 15, 18)
$\eta, \psi$ angles of misalignment (FIG. 17)
$\tau_{2i}, \tau_{3i}$ angles measured along slit #'s 2 and 3 from optical axis to point of star transit (FIG. 16)
$\tau$ orbital period
M mass of central body
G universal gravitational constant
$a$ semi-major axis of orbit
$\Omega, \gamma$ angles relating vehicle precession frame to astronomical frame (FIG. 19)
$\omega$ angular spin rate (FIGS. 17, 18)
$\Omega'$ angular precession rate (FIGS. 18, 19)
$\gamma$ symbol denoting first point of Aries (point in the constellation Aries where the sun appears to rise above the earth's equator each spring) (FIGS. 15, 19, 20)
S,S',N points on the celestial sphere marking projections of certain plane intersections (FIGS. 17, 18, 19)
E the ecliptic plane (FIGS. 1, 2)
$b$ a band representing a sector scanned by the optical system (FIG. 1)
$t_1$ time, in simple scan embodiment, which denotes target relative azimuth
$t_2, t_3, t_4$ times of body transits across each slit
$t_{21}, t_{31}$ transit times across slit #'s 2 and 3 of target
$t_0$ time when points S and S' coincide (FIGS. 17, 18)
$t_0'$ time when points S and N coincide (FIGS. 18, 19)
P distance of body from sun (FIGS. 21, 27)
$\Theta$ ecliptic longitude of body as viewed from sun (FIGS. 21, 27)
$\Phi$ ecliptic latitude of body as viewed from sun (FIG. 21, 27)
$\theta, \phi$ ecliptic azimuth and elevation of body as viewed from space vehicle (FIG. 27)
$x, y, z$ position of planet (Equations 2–4)
X, Y, Z position of space vehicle (Equations 11–13)
$m, n, b, c$ constants (Equations 5–10)
$\mathcal{R}$ weighted residuals (Equation 20, 21–23)
$w$ weighting functions (Equation 24)
$\sigma(\theta), \sigma(\phi)$ R.M.S. angle errors (Equation 24)
$2\Gamma$ angle between crossed slits (FIG. 25)
$\xi, \nu$ angular coordinates of planet center relative to star-determined zero azimuth and optical scan plane
$\phi_{ij}(m), \phi_{ij}(c)$ measured and computed angles of separation between $i^{th}$ and $j^{th}$ stars (FIG. 14)
T scan period
$I_1, I_2, I_3$ moments of inertia of rigid body
$\rho$ distance from space vehicle to solar system body
S$k$ horizon scanner (FIG. 26)
$P_r$ radiant power received by optical system
$\bar{P}, \bar{\rho}$ vectors
$I_o$ photomultiplier output current
$m_v$ visual magnitude of a target
$\mu = \omega(t_3 - t_2)/2$

We claim:
1. The method of determining the location of a vehicle in the ecliptic plane of the solar system including the following steps: scanning a sector of space about a scanning axis; identifying some of the stars in the sector and determining the attitude of the scanning axis; correcting the attitude of the scanning axis to dispose it normal to the ecliptic plane; scanning the ecliptic plane to view some of the planets lying substantially therein; identifying some of said planets; and determining the location of the vehicle with respect to known positions of the identified planets as recorded in an ephemeris.

2. The method of determining the location of a vehicle substantially within the ecliptic plane of the solar system including the following steps: scanning a sector of space within a solid angle about a scanning axis to determine relative angular separations between some of the stars in the scanned sector; comparing said separations with an almanac of stellar separations to identify the stars; determining from the identified stars the attitude in space of said scanning axis; correcting the attitude of said scanning axis to orient it normal to the ecliptic plane; scanning a sector of space including the ecliptic plane to determine relative angular separations between some of the planets scanned; identifying some of said planets; and determining from the last-mentioned angular separations the location of the vehicle in the ecliptic plane.

3. The method of determining the location of a vehicle substantially within the ecliptic plane of the solar system including the following steps: scanning a sector of space within a solid angle about a scanning axis; selecting stars within the scanned sector which have intensities falling within a predetermined range; determining the intensities of the stars selected and the relative angular separations therebetween; comparing said intensities and separations with an almanac of intensities and separations to identify the stars; determining the attitude in space of said scanning axis; correcting the attitude of said scanning axis to orient it normal to the ecliptic plane; scanning a sector of space including the ecliptic plane to determine relative angular separations between some of the planets scanned; identifying some of said planets; and determining from the last-mentioned angular separations the location of the vehicle in the ecliptic plane.

4. The method of determining the location of a vehicle substantially within the ecliptic plane of the solar system including the following steps: scanning a sector of space within a solid angle about a scanning axis; determining the relative angular separations between some of the stars in the scanned sector; comparing said separations with an almanac of stellar separations to identify the stars to thereby determine the orientation in space of said scanning axis;

correcting the attitude of said scanning axis to orient it normal to the ecliptic plane; scanning the ecliptic plane and identifying planets therewithin; determining the positions of the identified planets; and determining the location of the vehicle with respect to known positions of said planets.

5. The method of determining the location of a vehicle substantially within the ecliptic plane of the solar system including the following steps; orienting a scanning axis normal to the ecliptic plane; scanning a solid angle about said axis and including said plane to determine relative angular separations between a plurality of planets in the scanned sector; comparing said separations with an ephemeris of planetary positions; and statistically determining the relative location of the vehicle from a plurality of the angular separations determined while weighting most most heavily the separations between the least remote of the planets.

6. A system using the positions of planets for determining the location of a vehicle in the ecliptic plane, comprising a rotary scanning head supported on the vehicle and having an optical system directed outwardly from a spin axis oriented substantially normal to the ecliptic plane; photosensitive means in said head disposed to receive images of the planets focused thereon by the optical system and delivering signals representing the azimuth positions of the scanned planets in the ecliptic plane; means coupled with said photosensitive means to receive the signals and determine the relative angular separations of the images of successively scanned planets; first computer means coupled to said angle determining means for comparing the angles with an almanac of planetary positions to identify the planets associated with said signals; and second computer means for transposing the angular information from the coordinate frame of reference of the vehicle to a coordinate system defining the location of the vehicle in the ecliptic plane.

7. In a system as set forth in claim 6, bias means coupled with said photosensitive means and establishing a threshold of minimum intensity which must be exceeded by an image before a signal corresponding with that image will be delivered by said photosensitive means.

8. In a system as set forth in claim 6, precision oscillator means delivering uniformly spaced timing pulses; said first computer means being a digital computer and having a timing pulse counter coupled with the output of said precision oscillator; and gate means for passing pulses to the counter between output signals from the photosensitive means to provide digital input to the computer means representing angular separations.

9. In a system as set forth in claim 6, said first computer means comprising analog to digital conversion means for converting the analog angular separation signals respectively to digital angular separation signals; addressable register means for storing said digital signals; matrices having angular separations recorded therein; search means for comparing the measured separations with the recorded separations for each of a plurality of planets; and means for changing the measured separations to be searched one at a time and reactuating the search means until at least two matching separations are obtained.

10. In a system as set forth in claim 6, light masking means located substantially in the focal plane of the optical system and having at least two light transmissive slits for passing light to said photosensitive means, said slits intersecting each other on the central axis of the optical system and extending divergently away therefrom substantially in the direction of the spin axis, whereby images in a plane normal to the spin axis focus on the intersection of the slits and produce only one signal when scanned but images elevated out of said plane are traversed by both slits successively and produce a pair of signals spaced by a time which is a function of the degree of such elevation.

11. In a system as set forth in claim 10, said means for determining the annular separations between planets including means for averaging each pair of signals to provide one signal representing the azimuth position of the associated planet, and including means for differencing said signals to obtain another signal representing the elevation of the planet from said normal plane.

12. In a system as set forth in claim 10, photoelectric sensor means disposed adjacent to said slits for sensing the approach of sunlight theretoward; shutter means supported adjacent the photosensitive means; and shutter actuating means coupled to the sensor means for moving the shutter to cover the photosensitive means when sunlight falls on a sensor means.

13. An optical scanner for scanning a solid sector about a scanning plane disposed normal to a spin axis, comprising a housing; an optical system within said housing and having an optical axis lying in said plane; image masking means located substantially at the focal plane of the optical system and having plural intersecting light transmissive slits therethrough; photosensitive means in said housing and disposed to receive light passing through the slits, said slits intersecting each other and extending divergently away from the intersection at oblique angles to said plane, whereby the images of targets lying in said plane focus on the intersection of the slits and produce only one signal when scanned but images from targets elevated out of said plane are traversed successively by each of the slits and produce multiple signals spaced by time intervals which are a function of the degree of such elevation, said masking means having two crossed slits making equal oblique angles to said plane and having a third slit intersecting the other two at said plane and disposed normal thereto.

14. An optical scanner for scanning a solid sector about a scanning plane disposed normal to a spin axle, comprising a housing; an optical system within said housing and having an optical axis lying in said plane; image masking means located substantially at the focal plane of the optical system and having at least two intersecting light transmissive slits therethrough; photosensitive means in said housing and disposed to receive light passing through said slits, and drive means for rotating the housing about said spin axis comprising a shaft rotatably supporting said housing; a flywheel journaled on the shaft; and motor means coupled between the housing and the flywheel for rotating them in mutually opposite directions.

15. In a scanner as set forth in claim 14, the moment of inertia of the housing and the flywheel about said shaft being equal.

References Cited by the Examiner

UNITED STATES PATENTS

| | | | |
|---|---|---|---|
| 2,755,390 | 7/1956 | Teichmann | 250—227 X |
| 2,999,939 | 9/1961 | Bible et al. | 88—1 X |
| 3,002,278 | 10/1961 | Weems | 33—61 X |
| 3,020,406 | 2/1962 | Whitney | 250—83.3 |
| 3,034,405 | 5/1962 | Biberman et al. | 88—1 X |
| 3,037,121 | 5/1962 | Collison | 250—203 |
| 3,059,120 | 10/1962 | Anthony et al. | 250—203 X |
| 3,071,976 | 1/1963 | Kunz | 250—203 X |
| 3,076,095 | 1/1963 | Becklund et al. | 88—1 X |
| 3,090,583 | 5/1963 | Behun et al. | |
| 3,110,812 | 11/1963 | Hulett et al. | 250—203 |
| 3,120,578 | 2/1964 | Potter et al. | |
| 3,185,852 | 5/1965 | Lewis | 250—203 X |

ROBERT B. HULL, *Primary Examiner.*